United States Patent
Wright et al.

(10) Patent No.: US 10,198,466 B2
(45) Date of Patent: *Feb. 5, 2019

(54) DATA STORE ACCESS PERMISSION SYSTEM WITH INTERLEAVED APPLICATION OF DEFERRED ACCESS CONTROL FILTERS

(71) Applicant: Deephaven Data Labs LLC, Plymouth, MN (US)

(72) Inventors: Charles Wright, Cortlandt Manor, NY (US); Ryan Caudy, New York, NY (US); Raffi Basralian, New York, NY (US); Herve Bronnimann, New York, NY (US)

(73) Assignee: Deephaven Data Labs LLC, Plymouth, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/466,836

(22) Filed: Mar. 22, 2017

(65) Prior Publication Data
US 2017/0192910 A1   Jul. 6, 2017

Related U.S. Application Data

(63) Continuation of application No. 15/155,011, filed on May 14, 2016, now Pat. No. 9,639,570.

(Continued)

(51) Int. Cl.
G06F 17/30 (2006.01)
G06F 3/0482 (2013.01)
(Continued)

(52) U.S. Cl.
CPC ...... *G06F 17/30368* (2013.01); *G06F 3/0481* (2013.01); *G06F 3/0482* (2013.01);
(Continued)

(58) Field of Classification Search
CPC combination set(s) only.
See application file for complete search history.

(56) References Cited

U.S. PATENT DOCUMENTS 5,335,202 A   8/1994 Manning et al.
5,452,434 A   9/1995 Macdonald
(Continued)

FOREIGN PATENT DOCUMENTS

CA   2309462 A1   12/2000
EP   1406463 A2   4/2004
(Continued)

OTHER PUBLICATIONS

"About Entering Commands in the Command Window", dated Dec. 16, 2015. Retrieved from https://knowledge.autodesk.com/support/autocad/learn-explore/caas/CloudHelp/cloudhelp/2016/ENU/AutoCAD-Core/files/GUID-BB0C3E79-66AF-4557-9140-D31B4CF3C9CF-htm.html (last accessed Jun. 16, 2016).

(Continued)

Primary Examiner — Farhan M Syed
(74) Attorney, Agent, or Firm — Carmichael IP, PLLC

(57) ABSTRACT

Described are methods, systems and computer readable media for a permissions system including relationships of partitioning, grouping, and the application of access control deferred filters.

12 Claims, 10 Drawing Sheets

Related U.S. Application Data

(60) Provisional application No. 62/161,813, filed on May 14, 2015.

(51) Int. Cl.

| | |
|---|---|
| *G06F 3/0489* | (2013.01) |
| *G06F 17/22* | (2006.01) |
| *G06F 17/24* | (2006.01) |
| *G06F 17/27* | (2006.01) |
| *G06F 12/084* | (2016.01) |
| *H04L 12/58* | (2006.01) |
| *G06F 15/173* | (2006.01) |
| *G06F 3/0481* | (2013.01) |
| *G06F 3/0484* | (2013.01) |
| *G06F 3/0485* | (2013.01) |
| *G06F 12/02* | (2006.01) |
| *G06F 8/30* | (2018.01) |
| *G06F 8/41* | (2018.01) |
| *H04L 29/08* | (2006.01) |
| *G06F 3/06* | (2006.01) |
| *G06F 11/14* | (2006.01) |
| *H04L 29/06* | (2006.01) |
| *G06F 8/60* | (2018.01) |
| *H04L 12/18* | (2006.01) |
| *H04L 29/12* | (2006.01) |
| *G06F 12/14* | (2006.01) |
| *G06F 21/00* | (2013.01) |
| *G06F 21/62* | (2013.01) |
| *G06F 3/0483* | (2013.01) |
| *G06F 17/40* | (2006.01) |

(52) U.S. Cl.
CPC .......... *G06F 3/0483* (2013.01); *G06F 3/0485* (2013.01); *G06F 3/04847* (2013.01); *G06F 3/04895* (2013.01); *G06F 3/0605* (2013.01); *G06F 3/067* (2013.01); *G06F 3/0656* (2013.01); *G06F 8/30* (2013.01); *G06F 8/41* (2013.01); *G06F 8/427* (2013.01); *G06F 8/60* (2013.01); *G06F 11/1451* (2013.01); *G06F 11/1464* (2013.01); *G06F 11/1469* (2013.01); *G06F 12/0261* (2013.01); *G06F 12/084* (2013.01); *G06F 12/1483* (2013.01); *G06F 15/17331* (2013.01); *G06F 17/2235* (2013.01); *G06F 17/24* (2013.01); *G06F 17/245* (2013.01); *G06F 17/246* (2013.01); *G06F 17/276* (2013.01); *G06F 17/2715* (2013.01); *G06F 17/30117* (2013.01); *G06F 17/30283* (2013.01); *G06F 17/30303* (2013.01); *G06F 17/30312* (2013.01); *G06F 17/30315* (2013.01); *G06F 17/30321* (2013.01); *G06F 17/30324* (2013.01); *G06F 17/30327* (2013.01); *G06F 17/30333* (2013.01); *G06F 17/30336* (2013.01); *G06F 17/30339* (2013.01); *G06F 17/30345* (2013.01); *G06F 17/30371* (2013.01); *G06F 17/30374* (2013.01); *G06F 17/30377* (2013.01); *G06F 17/30398* (2013.01); *G06F 17/30424* (2013.01); *G06F 17/30448* (2013.01); *G06F 17/30451* (2013.01); *G06F 17/30454* (2013.01); *G06F 17/30457* (2013.01); *G06F 17/30477* (2013.01); *G06F 17/30483* (2013.01); *G06F 17/30498* (2013.01); *G06F 17/30522* (2013.01); *G06F 17/30528* (2013.01); *G06F 17/30554* (2013.01); *G06F 17/30563* (2013.01); *G06F 17/30584* (2013.01); *G06F 17/30598* (2013.01); *G06F 17/30864* (2013.01); *G06F 17/30867* (2013.01); *G06F 17/30887* (2013.01); *G06F 17/30902* (2013.01); *G06F 17/30958* (2013.01); *G06F 17/30997* (2013.01); *G06F 21/00* (2013.01); *G06F 21/6209* (2013.01); *H04L 12/18* (2013.01); *H04L 51/046* (2013.01); *H04L 51/12* (2013.01); *H04L 61/2069* (2013.01); *H04L 63/101* (2013.01); *H04L 63/102* (2013.01); *H04L 67/1002* (2013.01); *H04L 67/141* (2013.01); *H04L 67/28* (2013.01); *H04L 67/2833* (2013.01); *H04L 67/2842* (2013.01); *H04L 67/34* (2013.01); *H04L 67/42* (2013.01); *H04L 69/16* (2013.01); *G06F 17/30342* (2013.01); *G06F 17/40* (2013.01); *G06F 2201/805* (2013.01); *G06F 2201/84* (2013.01); *G06F 2212/1052* (2013.01); *G06F 2212/154* (2013.01); *G06F 2212/163* (2013.01); *G06F 2212/60* (2013.01); *H04L 67/2847* (2013.01)

(56) References Cited

U.S. PATENT DOCUMENTS

| | | |
|---|---|---|
| 5,469,567 A | 11/1995 | Okada |
| 5,504,885 A | 4/1996 | Alashqur |
| 5,530,939 A | 6/1996 | Mansfield et al. |
| 5,568,632 A | 10/1996 | Nelson |
| 5,673,369 A | 9/1997 | Kim |
| 5,701,461 A | 12/1997 | Dalal et al. |
| 5,701,467 A | 12/1997 | Freeston |
| 5,764,953 A | 6/1998 | Collins et al. |
| 5,787,428 A | 7/1998 | Hart |
| 5,806,059 A | 9/1998 | Tsuchida et al. |
| 5,859,972 A | 1/1999 | Subramaniam et al. |
| 5,875,334 A | 2/1999 | Chow et al. |
| 5,878,415 A * | 3/1999 | Olds ................... G06F 21/6218 |
| 5,890,167 A | 3/1999 | Bridge et al. |
| 5,899,990 A | 5/1999 | Maritzen et al. |
| 5,920,860 A | 7/1999 | Maheshwari et al. |
| 5,943,672 A | 8/1999 | Yoshida |
| 5,960,087 A | 9/1999 | Tribble et al. |
| 5,991,810 A | 11/1999 | Shapiro et al. |
| 5,999,918 A | 12/1999 | Williams et al. |
| 6,006,220 A | 12/1999 | Haderle et al. |
| 6,032,144 A | 2/2000 | Srivastava et al. |
| 6,032,148 A | 2/2000 | Wilkes |
| 6,038,563 A * | 3/2000 | Bapat ........................ G06F 1/00 |
| 6,058,394 A | 5/2000 | Bakow et al. |
| 6,061,684 A * | 5/2000 | Glasser ............ G06F 17/30221 |
| 6,138,112 A | 10/2000 | Slutz |
| 6,160,548 A | 12/2000 | Lea et al. |
| 6,266,669 B1 | 7/2001 | Brodersen et al. |
| 6,289,357 B1 | 9/2001 | Parker |
| 6,292,803 B1 | 9/2001 | Richardson et al. |
| 6,304,876 B1 | 10/2001 | Isip |
| 6,317,728 B1 | 11/2001 | Kane |
| 6,327,702 B1 | 12/2001 | Sauntry et al. |
| 6,336,114 B1 | 1/2002 | Garrison |
| 6,353,819 B1 | 3/2002 | Edwards et al. |
| 6,367,068 B1 | 4/2002 | Vaidyanathan et al. |
| 6,389,414 B1 | 5/2002 | Delo et al. |
| 6,389,462 B1 | 5/2002 | Cohen et al. |
| 6,438,537 B1 | 8/2002 | Netz et al. |
| 6,446,069 B1 | 9/2002 | Yaung et al. |
| 6,460,037 B1 | 10/2002 | Weiss et al. |
| 6,473,750 B1 | 10/2002 | Petculescu et al. |
| 6,487,552 B1 | 11/2002 | Lei et al. |
| 6,496,833 B1 | 12/2002 | Goldberg et al. |
| 6,505,189 B1 | 1/2003 | Au et al. |
| 6,505,241 B2 | 1/2003 | Pitts |
| 6,510,551 B1 | 1/2003 | Miller |
| 6,530,075 B1 | 3/2003 | Beadle et al. |
| 6,538,651 B1 | 3/2003 | Hayman et al. |
| 6,546,402 B1 | 4/2003 | Beyer et al. |

(56) References Cited

U.S. PATENT DOCUMENTS

| | | | |
|---|---|---|---|
| 6,553,375 B1 | 4/2003 | Huang et al. |
| 6,584,474 B1 | 6/2003 | Pereira |
| 6,604,104 B1 | 8/2003 | Smith |
| 6,618,720 B1 | 9/2003 | Au et al. |
| 6,631,374 B1 | 10/2003 | Klein et al. |
| 6,640,234 B1 | 10/2003 | Coffen et al. |
| 6,697,880 B1 | 2/2004 | Dougherty |
| 6,701,415 B1 | 3/2004 | Hendren |
| 6,714,962 B1 | 3/2004 | Helland et al. |
| 6,725,243 B2 | 4/2004 | Snapp |
| 6,732,100 B1 | 5/2004 | Brodersen et al. |
| 6,745,332 B1 | 6/2004 | Wong et al. |
| 6,748,374 B1 | 6/2004 | Madan et al. |
| 6,748,455 B1 | 6/2004 | Hinson et al. |
| 6,760,719 B1 | 7/2004 | Hanson et al. |
| 6,775,660 B2 | 8/2004 | Lin et al. |
| 6,785,668 B1 | 8/2004 | Polo et al. |
| 6,795,851 B1 | 9/2004 | Noy |
| 6,816,855 B2 | 11/2004 | Hartel et al. |
| 6,820,082 B1 | 11/2004 | Cook et al. |
| 6,829,620 B2 | 12/2004 | Michael et al. |
| 6,832,229 B2 | 12/2004 | Reed |
| 6,851,088 B1 | 2/2005 | Conner et al. |
| 6,882,994 B2 | 4/2005 | Yoshimura et al. |
| 6,925,472 B2 | 8/2005 | Kong |
| 6,934,717 B1 | 8/2005 | James |
| 6,947,928 B2 | 9/2005 | Dettinger et al. |
| 6,983,291 B1 | 1/2006 | Cochrane et al. |
| 6,985,895 B2 | 1/2006 | Witkowski et al. |
| 6,985,899 B2 | 1/2006 | Chan et al. |
| 6,985,904 B1 | 1/2006 | Kaluskar et al. |
| 7,020,649 B2 | 3/2006 | Cochrane et al. |
| 7,024,414 B2 | 4/2006 | Sah et al. |
| 7,031,962 B2 * | 4/2006 | Moses ................ G06F 21/6218 707/783 |
| 7,058,657 B1 | 6/2006 | Berno |
| 7,089,228 B2 | 8/2006 | Arnold et al. |
| 7,089,245 B1 | 8/2006 | George et al. |
| 7,096,216 B2 | 8/2006 | Anonsen |
| 7,099,927 B2 | 8/2006 | Cudd et al. |
| 7,103,608 B1 | 9/2006 | Ozbutun et al. |
| 7,110,997 B1 | 9/2006 | Turkel et al. |
| 7,127,462 B2 | 10/2006 | Hiraga et al. |
| 7,146,357 B2 | 12/2006 | Suzuki et al. |
| 7,149,742 B1 | 12/2006 | Eastham et al. |
| 7,167,870 B2 | 1/2007 | Avvari et al. |
| 7,171,469 B2 | 1/2007 | Ackaouy et al. |
| 7,174,341 B2 | 2/2007 | Ghukasyan et al. |
| 7,181,686 B1 | 2/2007 | Bahrs |
| 7,188,105 B2 | 3/2007 | Dettinger et al. |
| 7,200,620 B2 | 4/2007 | Gupta |
| 7,216,115 B1 | 5/2007 | Walters et al. |
| 7,216,116 B1 | 5/2007 | Nilsson et al. |
| 7,219,302 B1 | 5/2007 | O'Shaughnessy et al. |
| 7,225,189 B1 | 5/2007 | McCormack et al. |
| 7,254,808 B2 | 8/2007 | Trappen et al. |
| 7,257,689 B1 | 8/2007 | Baird |
| 7,272,605 B1 | 9/2007 | Hinshaw et al. |
| 7,308,580 B2 | 12/2007 | Nelson et al. |
| 7,316,003 B1 | 1/2008 | Dulepet et al. |
| 7,330,969 B2 | 2/2008 | Harrison et al. |
| 7,333,941 B1 | 2/2008 | Choi |
| 7,343,585 B1 | 3/2008 | Lau et al. |
| 7,350,237 B2 * | 3/2008 | Vogel ................ G06F 21/6218 707/999.009 |
| 7,380,242 B2 | 5/2008 | Alaluf |
| 7,401,088 B2 | 7/2008 | Chintakayala et al. |
| 7,426,521 B2 | 9/2008 | Harter |
| 7,430,549 B2 | 9/2008 | Zane et al. |
| 7,433,863 B2 | 10/2008 | Zane et al. |
| 7,447,865 B2 | 11/2008 | Uppala et al. |
| 7,478,094 B2 | 1/2009 | Ho et al. |
| 7,484,096 B1 | 1/2009 | Garg et al. |
| 7,493,311 B1 | 2/2009 | Cutsinger et al. |
| 7,506,055 B2 | 3/2009 | McClain et al. |
| 7,529,734 B2 | 5/2009 | Dirisala |
| 7,529,750 B2 | 5/2009 | Bair |
| 7,542,958 B1 | 6/2009 | Warren et al. |
| 7,552,223 B1 | 6/2009 | Ackaouy et al. |
| 7,610,351 B1 | 10/2009 | Gollapudi et al. |
| 7,620,687 B2 | 11/2009 | Chen et al. |
| 7,624,126 B2 | 11/2009 | Pizzo et al. |
| 7,627,603 B2 | 12/2009 | Rosenblum et al. |
| 7,661,141 B2 | 2/2010 | Dutta et al. |
| 7,664,778 B2 | 2/2010 | Yagoub et al. |
| 7,672,275 B2 | 3/2010 | Yajnik et al. |
| 7,680,782 B2 | 3/2010 | Chen et al. |
| 7,711,716 B2 | 5/2010 | Stonecipher |
| 7,711,740 B2 | 5/2010 | Minore et al. |
| 7,747,640 B2 | 6/2010 | Dettinger et al. |
| 7,761,444 B2 | 7/2010 | Zhang et al. |
| 7,797,356 B2 | 9/2010 | Iyer et al. |
| 7,827,204 B2 | 11/2010 | Heinzel et al. |
| 7,827,403 B2 | 11/2010 | Wong et al. |
| 7,827,523 B2 | 11/2010 | Ahmed et al. |
| 7,882,121 B2 | 2/2011 | Bruno et al. |
| 7,882,132 B2 * | 2/2011 | Ghatare ............ G06F 17/30569 707/782 |
| 7,904,487 B2 * | 3/2011 | Ghatare ............ G06F 17/30427 707/756 |
| 7,908,259 B2 | 3/2011 | Branscome et al. |
| 7,908,266 B2 | 3/2011 | Zeringue et al. |
| 7,930,412 B2 | 4/2011 | Yeap et al. |
| 7,966,311 B2 | 6/2011 | Haase |
| 7,966,312 B2 | 6/2011 | Nolan et al. |
| 7,966,343 B2 | 6/2011 | Yang et al. |
| 7,970,777 B2 | 6/2011 | Saxena et al. |
| 7,979,431 B2 | 7/2011 | Qazi et al. |
| 7,984,043 B1 | 7/2011 | Waas |
| 8,019,795 B2 | 9/2011 | Anderson et al. |
| 8,027,293 B2 | 9/2011 | Spaur et al. |
| 8,032,525 B2 | 10/2011 | Bowers et al. |
| 8,037,542 B2 | 10/2011 | Taylor et al. |
| 8,046,394 B1 | 10/2011 | Shatdal |
| 8,046,749 B1 | 10/2011 | Owen et al. |
| 8,055,672 B2 | 11/2011 | Djugash et al. |
| 8,060,484 B2 | 11/2011 | Bandera et al. |
| 8,171,018 B2 | 5/2012 | Zane et al. |
| 8,180,789 B1 | 5/2012 | Wasserman et al. |
| 8,196,121 B2 | 6/2012 | Peshansky et al. |
| 8,209,356 B1 | 6/2012 | Roesler |
| 8,286,189 B2 | 10/2012 | Kukreja et al. |
| 8,321,833 B2 | 11/2012 | Langworthy et al. |
| 8,332,435 B2 | 12/2012 | Ballard et al. |
| 8,359,305 B1 | 1/2013 | Burke et al. |
| 8,375,127 B1 | 2/2013 | Lita |
| 8,380,757 B1 | 2/2013 | Bailey et al. |
| 8,418,142 B2 | 4/2013 | Ao et al. |
| 8,433,701 B2 | 4/2013 | Sargeant et al. |
| 8,458,218 B2 | 6/2013 | Wildermuth |
| 8,473,897 B2 | 6/2013 | Box et al. |
| 8,478,713 B2 | 7/2013 | Cotner et al. |
| 8,515,942 B2 | 8/2013 | Marum et al. |
| 8,543,620 B2 | 9/2013 | Ching |
| 8,553,028 B1 | 10/2013 | Urbach |
| 8,555,263 B2 | 10/2013 | Allen et al. |
| 8,560,502 B2 | 10/2013 | Vora |
| 8,595,151 B2 | 11/2013 | Hao et al. |
| 8,601,016 B2 | 12/2013 | Briggs et al. |
| 8,631,034 B1 | 1/2014 | Peloski |
| 8,650,182 B2 | 2/2014 | Murthy |
| 8,660,869 B2 | 2/2014 | MacIntyre et al. |
| 8,676,863 B1 | 3/2014 | Connell et al. |
| 8,683,488 B2 | 3/2014 | Kukreja et al. |
| 8,713,518 B2 | 4/2014 | Pointer et al. |
| 8,719,252 B2 | 5/2014 | Miranker et al. |
| 8,725,707 B2 | 5/2014 | Chen et al. |
| 8,726,254 B2 | 5/2014 | Rohde et al. |
| 8,745,014 B2 | 6/2014 | Travis |
| 8,745,510 B2 | 6/2014 | D'Alo' et al. |
| 8,751,823 B2 | 6/2014 | Myles et al. |
| 8,768,961 B2 | 7/2014 | Krishnamurthy |
| 8,788,254 B2 | 7/2014 | Peloski |
| 8,793,243 B2 | 7/2014 | Weyerhaeuser et al. |

(56) References Cited

U.S. PATENT DOCUMENTS

| | | |
|---|---|---|
| 8,805,947 B1 | 8/2014 | Kuzkin et al. |
| 8,806,133 B2 | 8/2014 | Hay et al. |
| 8,812,625 B1 | 8/2014 | Chitilian et al. |
| 8,838,656 B1 | 9/2014 | Cheriton |
| 8,855,999 B1 | 10/2014 | Elliot |
| 8,863,156 B1 | 10/2014 | Lepanto et al. |
| 8,874,512 B2 | 10/2014 | Jin et al. |
| 8,880,569 B2 | 11/2014 | Draper et al. |
| 8,880,787 B1 | 11/2014 | Kimmel et al. |
| 8,881,121 B2 | 11/2014 | Ali |
| 8,886,631 B2 | 11/2014 | Abadi et al. |
| 8,903,717 B2 | 12/2014 | Elliot |
| 8,903,842 B2 | 12/2014 | Bloesch et al. |
| 8,922,579 B2 | 12/2014 | Mi et al. |
| 8,924,384 B2 | 12/2014 | Driesen et al. |
| 8,930,892 B2 | 1/2015 | Pointer et al. |
| 8,954,418 B2 | 2/2015 | Faerber et al. |
| 8,959,495 B2 | 2/2015 | Chafi et al. |
| 8,996,864 B2 | 3/2015 | Maigne et al. |
| 9,031,930 B2 | 5/2015 | Valentin |
| 9,077,611 B2 | 7/2015 | Cordray et al. |
| 9,122,765 B1 | 9/2015 | Chen |
| 9,195,712 B2 | 11/2015 | Freedman et al. |
| 9,298,768 B2 | 3/2016 | Varakin et al. |
| 9,311,357 B2 | 4/2016 | Ramesh et al. |
| 9,372,671 B2 | 6/2016 | Balan et al. |
| 9,384,184 B2 | 7/2016 | Cervantes et al. |
| 9,612,959 B2 | 4/2017 | Caudy et al. |
| 9,613,018 B2 | 4/2017 | Zeldis et al. |
| 9,613,109 B2 | 4/2017 | Wright et al. |
| 9,619,210 B2 | 4/2017 | Kent et al. |
| 9,633,060 B2 | 4/2017 | Caudy et al. |
| 9,639,570 B2 | 5/2017 | Wright et al. |
| 9,672,238 B2 | 6/2017 | Wright et al. |
| 9,679,006 B2 | 6/2017 | Wright et al. |
| 9,690,821 B2 | 6/2017 | Wright et al. |
| 9,710,511 B2 | 7/2017 | Wright et al. |
| 9,760,591 B2 | 9/2017 | Caudy et al. |
| 9,805,084 B2 | 10/2017 | Wright et al. |
| 9,832,068 B2 | 11/2017 | McSherry et al. |
| 9,836,494 B2 | 12/2017 | Caudy et al. |
| 9,836,495 B2 | 12/2017 | Wright |
| 9,886,469 B2 | 2/2018 | Kent et al. |
| 9,898,496 B2 | 2/2018 | Caudy et al. |
| 9,934,266 B2 | 4/2018 | Wright et al. |
| 10,002,153 B2 | 6/2018 | Teodorescu et al. |
| 10,002,154 B1 | 6/2018 | Kent et al. |
| 10,002,155 B1 | 6/2018 | Caudy et al. |
| 10,003,673 B2 | 6/2018 | Caudy et al. |
| 10,019,138 B2 | 7/2018 | Zeldis et al. |
| 10,069,943 B2 | 9/2018 | Teodorescu et al. |
| 2002/0002576 A1 | 1/2002 | Wollrath et al. |
| 2002/0007331 A1 | 1/2002 | Lo et al. |
| 2002/0054587 A1 | 5/2002 | Baker et al. |
| 2002/0065981 A1 | 5/2002 | Jenne et al. |
| 2002/0129168 A1 | 9/2002 | Kanai et al. |
| 2002/0156722 A1 | 10/2002 | Greenwood |
| 2003/0004952 A1 | 1/2003 | Nixon et al. |
| 2003/0061216 A1* | 3/2003 | Moses ............... G06F 21/6218 |
| 2003/0074400 A1 | 4/2003 | Brooks et al. |
| 2003/0110416 A1 | 6/2003 | Morrison et al. |
| 2003/0167261 A1 | 9/2003 | Grust et al. |
| 2003/0182261 A1 | 9/2003 | Patterson |
| 2003/0208484 A1 | 11/2003 | Chang et al. |
| 2003/0208505 A1 | 11/2003 | Mullins et al. |
| 2003/0233632 A1 | 12/2003 | Aigen et al. |
| 2004/0002961 A1 | 1/2004 | Dettinger et al. |
| 2004/0076155 A1 | 4/2004 | Yajnik et al. |
| 2004/0111492 A1 | 6/2004 | Nakahara et al. |
| 2004/0148630 A1 | 7/2004 | Choi |
| 2004/0186813 A1 | 9/2004 | Tedesco et al. |
| 2004/0216150 A1 | 10/2004 | Scheifler et al. |
| 2004/0220923 A1 | 11/2004 | Nica |
| 2004/0254876 A1 | 12/2004 | Coval et al. |
| 2005/0015490 A1 | 1/2005 | Saare et al. |
| 2005/0060693 A1 | 3/2005 | Robison et al. |
| 2005/0097447 A1 | 5/2005 | Serra et al. |
| 2005/0102284 A1 | 5/2005 | Srinivasan et al. |
| 2005/0102636 A1 | 5/2005 | McKeon et al. |
| 2005/0131893 A1 | 6/2005 | Glan |
| 2005/0132384 A1 | 6/2005 | Morrison et al. |
| 2005/0138624 A1 | 6/2005 | Morrison et al. |
| 2005/0165866 A1 | 7/2005 | Bohannon et al. |
| 2005/0198001 A1 | 9/2005 | Cunningham et al. |
| 2006/0059253 A1 | 3/2006 | Goodman et al. |
| 2006/0074901 A1 | 4/2006 | Pirahesh et al. |
| 2006/0085490 A1 | 4/2006 | Baron et al. |
| 2006/0100989 A1 | 5/2006 | Chinchwadkar et al. |
| 2006/0101019 A1 | 5/2006 | Nelson et al. |
| 2006/0116983 A1 | 6/2006 | Dettinger et al. |
| 2006/0116999 A1 | 6/2006 | Dettinger et al. |
| 2006/0136361 A1 | 6/2006 | Peri et al. |
| 2006/0173693 A1 | 8/2006 | Arazi et al. |
| 2006/0195460 A1 | 8/2006 | Nori et al. |
| 2006/0212847 A1 | 9/2006 | Tarditi et al. |
| 2006/0218123 A1 | 9/2006 | Chowdhuri et al. |
| 2006/0218200 A1 | 9/2006 | Factor et al. |
| 2006/0230016 A1 | 10/2006 | Cunningham et al. |
| 2006/0253311 A1 | 11/2006 | Yin et al. |
| 2006/0271510 A1 | 11/2006 | Harward et al. |
| 2006/0277162 A1 | 12/2006 | Smith |
| 2007/0011211 A1 | 1/2007 | Reeves et al. |
| 2007/0027884 A1 | 2/2007 | Heger et al. |
| 2007/0033518 A1 | 2/2007 | Kenna et al. |
| 2007/0073765 A1 | 3/2007 | Chen |
| 2007/0101252 A1 | 5/2007 | Chamberlain et al. |
| 2007/0116287 A1 | 5/2007 | Rasizade et al. |
| 2007/0169003 A1 | 7/2007 | Branda et al. |
| 2007/0256060 A1 | 11/2007 | Ryu et al. |
| 2007/0258508 A1 | 11/2007 | Werb et al. |
| 2007/0271280 A1 | 11/2007 | Chandasekaran |
| 2007/0299822 A1 | 12/2007 | Jopp et al. |
| 2008/0022136 A1 | 1/2008 | Mattsson et al. |
| 2008/0033907 A1 | 2/2008 | Woehler et al. |
| 2008/0034084 A1 | 2/2008 | Pandya |
| 2008/0046804 A1 | 2/2008 | Rui et al. |
| 2008/0072150 A1 | 3/2008 | Chan et al. |
| 2008/0120283 A1 | 5/2008 | Liu et al. |
| 2008/0155565 A1 | 6/2008 | Poduri |
| 2008/0168135 A1 | 7/2008 | Redlich et al. |
| 2008/0235238 A1 | 9/2008 | Jalobeanu et al. |
| 2008/0263179 A1 | 10/2008 | Buttner et al. |
| 2008/0276241 A1 | 11/2008 | Bajpai et al. |
| 2008/0319951 A1 | 12/2008 | Ueno et al. |
| 2009/0019029 A1 | 1/2009 | Tommaney et al. |
| 2009/0022095 A1 | 1/2009 | Spaur et al. |
| 2009/0024615 A1 | 1/2009 | Pedro et al. |
| 2009/0037391 A1 | 2/2009 | Agrawal et al. |
| 2009/0055370 A1 | 2/2009 | Dagum et al. |
| 2009/0083215 A1 | 3/2009 | Burger |
| 2009/0089312 A1 | 4/2009 | Chi et al. |
| 2009/0248902 A1 | 10/2009 | Blue |
| 2009/0254516 A1 | 10/2009 | Meiyyappan et al. |
| 2009/0271472 A1 | 10/2009 | Scheifler et al. |
| 2009/0300770 A1 | 12/2009 | Rowney et al. |
| 2009/0319058 A1 | 12/2009 | Rovaglio et al. |
| 2009/0319484 A1 | 12/2009 | Golbandi et al. |
| 2009/0327242 A1 | 12/2009 | Brown et al. |
| 2010/0036801 A1 | 2/2010 | Pirvali et al. |
| 2010/0042587 A1 | 2/2010 | Johnson et al. |
| 2010/0047760 A1 | 2/2010 | Best et al. |
| 2010/0049715 A1 | 2/2010 | Jacobsen et al. |
| 2010/0161555 A1 | 6/2010 | Nica et al. |
| 2010/0186082 A1 | 7/2010 | Ladki et al. |
| 2010/0199161 A1 | 8/2010 | Aureglia et al. |
| 2010/0205017 A1 | 8/2010 | Sichelman et al. |
| 2010/0205351 A1 | 8/2010 | Wiener et al. |
| 2010/0281005 A1 | 11/2010 | Carlin et al. |
| 2010/0281071 A1 | 11/2010 | Ben-Zvi et al. |
| 2011/0126110 A1 | 5/2011 | Vilke et al. |
| 2011/0126154 A1 | 5/2011 | Boehler et al. |
| 2011/0153603 A1 | 6/2011 | Adiba et al. |
| 2011/0161378 A1 | 6/2011 | Williamson |
| 2011/0167020 A1 | 7/2011 | Yang et al. |

(56) References Cited

U.S. PATENT DOCUMENTS

| | | |
|---|---|---|
| 2011/0178984 A1 | 7/2011 | Talius et al. |
| 2011/0194563 A1 | 8/2011 | Shen et al. |
| 2011/0219020 A1 | 9/2011 | Oks et al. |
| 2011/0314019 A1 | 12/2011 | Peris |
| 2012/0110030 A1 | 5/2012 | Pomponio |
| 2012/0144234 A1 | 6/2012 | Clark et al. |
| 2012/0159303 A1 | 6/2012 | Friedrich et al. |
| 2012/0191446 A1 | 7/2012 | Binsztok et al. |
| 2012/0192096 A1 | 7/2012 | Bowman et al. |
| 2012/0197868 A1 | 8/2012 | Fauser et al. |
| 2012/0209886 A1 | 8/2012 | Henderson |
| 2012/0215741 A1 | 8/2012 | Poole et al. |
| 2012/0221528 A1 | 8/2012 | Renkes |
| 2012/0246052 A1 | 9/2012 | Taylor et al. |
| 2012/0254143 A1 | 10/2012 | Varma et al. |
| 2012/0259759 A1 | 10/2012 | Crist et al. |
| 2012/0296846 A1 | 11/2012 | Teeter |
| 2013/0041946 A1 | 2/2013 | Joel et al. |
| 2013/0080514 A1 | 3/2013 | Gupta et al. |
| 2013/0086107 A1 | 4/2013 | Genochio et al. |
| 2013/0166556 A1 | 6/2013 | Baeumges et al. |
| 2013/0173667 A1 | 7/2013 | Soderberg et al. |
| 2013/0179460 A1 | 7/2013 | Cervantes et al. |
| 2013/0185619 A1 | 7/2013 | Ludwig |
| 2013/0191370 A1 | 7/2013 | Chen et al. |
| 2013/0198232 A1 | 8/2013 | Shamgunov et al. |
| 2013/0226959 A1 | 8/2013 | Dittrich et al. |
| 2013/0246560 A1 | 9/2013 | Feng et al. |
| 2013/0263123 A1 | 10/2013 | Zhou et al. |
| 2013/0290243 A1 | 10/2013 | Hazel et al. |
| 2013/0304725 A1 | 11/2013 | Nee et al. |
| 2013/0304744 A1 | 11/2013 | McSherry et al. |
| 2013/0311352 A1 | 11/2013 | Kayanuma et al. |
| 2013/0311488 A1 | 11/2013 | Erdogan et al. |
| 2013/0318129 A1 | 11/2013 | Vingralek et al. |
| 2013/0346365 A1 | 12/2013 | Kan et al. |
| 2014/0019494 A1 | 1/2014 | Tang |
| 2014/0040203 A1 | 2/2014 | Lu et al. |
| 2014/0059646 A1 | 2/2014 | Hannel et al. |
| 2014/0082724 A1 | 3/2014 | Pearson et al. |
| 2014/0136521 A1 | 5/2014 | Pappas |
| 2014/0143123 A1 | 5/2014 | Banke et al. |
| 2014/0149997 A1 | 5/2014 | Kukreja et al. |
| 2014/0156618 A1 | 6/2014 | Castellano |
| 2014/0173023 A1 | 6/2014 | Varney et al. |
| 2014/0181036 A1 | 6/2014 | Dhamankar et al. |
| 2014/0181081 A1 | 6/2014 | Veldhuizen |
| 2014/0188924 A1 | 7/2014 | Ma et al. |
| 2014/0195558 A1 | 7/2014 | Murthy et al. |
| 2014/0201194 A1 | 7/2014 | Reddy et al. |
| 2014/0215446 A1 | 7/2014 | Araya et al. |
| 2014/0222768 A1 | 8/2014 | Rambo et al. |
| 2014/0229506 A1 | 8/2014 | Lee |
| 2014/0229874 A1 | 8/2014 | Strauss |
| 2014/0244687 A1 | 8/2014 | Shmueli et al. |
| 2014/0279810 A1 | 9/2014 | Mann et al. |
| 2014/0280522 A1 | 9/2014 | Watte |
| 2014/0282227 A1 | 9/2014 | Nixon et al. |
| 2014/0282444 A1 | 9/2014 | Araya et al. |
| 2014/0282540 A1 | 9/2014 | Bonnet et al. |
| 2014/0292765 A1 | 10/2014 | Maruyama et al. |
| 2014/0297611 A1 | 10/2014 | Abbour et al. |
| 2014/0317084 A1 | 10/2014 | Chaudhry et al. |
| 2014/0324821 A1 | 10/2014 | Meiyyappan et al. |
| 2014/0330700 A1 | 11/2014 | Studnitzer et al. |
| 2014/0330807 A1 | 11/2014 | Weyerhaeuser et al. |
| 2014/0344186 A1 | 11/2014 | Nadler |
| 2014/0344391 A1 | 11/2014 | Varney et al. |
| 2014/0359574 A1 | 12/2014 | Beckwith et al. |
| 2014/0372482 A1 | 12/2014 | Martin et al. |
| 2014/0380051 A1 | 12/2014 | Edward et al. |
| 2015/0019516 A1 | 1/2015 | Wein et al. |
| 2015/0026155 A1 | 1/2015 | Martin |
| 2015/0067640 A1 | 3/2015 | Booker et al. |
| 2015/0074066 A1 | 3/2015 | Li et al. |
| 2015/0082218 A1 | 3/2015 | Affoneh et al. |
| 2015/0088894 A1 | 3/2015 | Czarlinska et al. |
| 2015/0095381 A1 | 4/2015 | Chen et al. |
| 2015/0120261 A1 | 4/2015 | Giannacopoulos et al. |
| 2015/0127599 A1 | 5/2015 | Schiebeler |
| 2015/0154262 A1 | 6/2015 | Yang et al. |
| 2015/0172117 A1 | 6/2015 | Dolinsky et al. |
| 2015/0188778 A1 | 7/2015 | Asayag et al. |
| 2015/0205588 A1 | 7/2015 | Bates et al. |
| 2015/0205589 A1 | 7/2015 | Dally |
| 2015/0254298 A1 | 9/2015 | Bourbonnais et al. |
| 2015/0304182 A1 | 10/2015 | Brodsky et al. |
| 2015/0317359 A1 | 11/2015 | Tran et al. |
| 2015/0356157 A1 | 12/2015 | Anderson et al. |
| 2016/0026442 A1 | 1/2016 | Chhaparia |
| 2016/0065670 A1 | 3/2016 | Kimmel et al. |
| 2016/0092599 A1 | 3/2016 | Barsness et al. |
| 2016/0125018 A1 | 5/2016 | Tomoda et al. |
| 2016/0171070 A1 | 6/2016 | Hrle et al. |
| 2016/0179754 A1 | 6/2016 | Borza et al. |
| 2016/0253294 A1 | 9/2016 | Allen et al. |
| 2016/0316038 A1 | 10/2016 | Jolfaei |
| 2016/0335281 A1 | 11/2016 | Teodorescu et al. |
| 2016/0335304 A1 | 11/2016 | Teodorescu et al. |
| 2016/0335317 A1 | 11/2016 | Teodorescu et al. |
| 2016/0335323 A1 | 11/2016 | Teodorescu et al. |
| 2016/0335330 A1 | 11/2016 | Teodorescu et al. |
| 2016/0335361 A1 | 11/2016 | Teodorescu et al. |
| 2017/0161514 A1 | 6/2017 | Dettinger et al. |
| 2017/0177677 A1 | 6/2017 | Wright et al. |
| 2017/0185385 A1 | 6/2017 | Kent et al. |
| 2017/0206229 A1 | 7/2017 | Caudy et al. |
| 2017/0206256 A1 | 7/2017 | Tsirogiannis et al. |
| 2017/0235794 A1 | 8/2017 | Wright et al. |
| 2017/0235798 A1 | 8/2017 | Wright et al. |
| 2017/0249350 A1 | 8/2017 | Wright et al. |
| 2017/0270150 A1 | 9/2017 | Wright et al. |
| 2017/0316046 A1 | 11/2017 | Caudy et al. |
| 2017/0359415 A1 | 12/2017 | Venkatraman et al. |
| 2018/0004796 A1 | 1/2018 | Kent et al. |
| 2018/0011891 A1 | 1/2018 | Wright et al. |
| 2018/0052879 A1 | 2/2018 | Wright |
| 2018/0137175 A1 | 5/2018 | Teodorescu et al. |

FOREIGN PATENT DOCUMENTS

| | | |
|---|---|---|
| EP | 1198769 B1 | 6/2008 |
| EP | 2199961 A1 | 6/2010 |
| EP | 2423816 A1 | 2/2012 |
| EP | 2743839 A1 | 6/2014 |
| RU | 2421798 | 6/2011 |
| WO | 2000000879 A2 | 1/2000 |
| WO | 2001079964 A2 | 10/2001 |
| WO | 2011120161 A1 | 10/2011 |
| WO | 2012136627 A1 | 10/2012 |
| WO | 2014026220 A1 | 2/2014 |
| WO | 2014143208 A1 | 9/2014 |

OTHER PUBLICATIONS

"Change Data Capture", Oracle Database Online Documentation 11g Release 1 (11.1), dated Apr. 5, 2016. Retreived from https://web.archive.org/web/20160405032625/http://docs.oracle.com/cd/B28359_01/server.111/b28313/cdc.htm.

"Chapter 24. Query access plans", Tuning Database Performance, DB2 Version 9.5 for Linux, UNIX, and Windows, pp. 301-462, dated Dec. 2010. Retreived from http://public.dhe.ibm.com/ps/products/db2/info/vr95/pdf/en_US/DB2PerfTuneTroubleshoot-db2d3e953.pdf.

"GNU Emacs Manual", dated Apr. 15, 2016, pp. 43-47. Retrieved from https://web.archive.org/web/20160415175915/http://www.gnu.org/software/emacs/manual/html_mono/emacs.html.

"Google Protocol RPC Library Overview", dated Apr. 27, 2016. Retrieved from https://cloud.google.com/appengine/docs/python/tools/protorpc/ (last accessed Jun. 16, 2016).

(56) References Cited

OTHER PUBLICATIONS

"IBM—What is HBase?", dated Sep. 6, 2015. Retrieved from https://web.archive.org/web/20150906022050/http://www-01.ibm.com/software/data/infosphere/hadoop/hbase/.
"IBM Informix TimeSeries data management", dated Jan. 18, 2016. Retrieved from https://web.archive.org/web/20160118072141/http://www-01.ibm.com/software/data/informix/timeseries/.
"IBM InfoSphere BigInsights 3.0.0—Importing data from and exporting data to DB2 by using Sqoop", dated Jan. 15, 2015. Retrieved from https://web.archive.org/web/20150115034058/http://www-01.ibm.com/support/knowledgecenter/SSPT3X_3.0.0/com.ibm.swg.im.infosphere.biginsights.import.doc/doc/data_warehouse_sqoop.html.
"Maximize Data Value with Very Large Database Management by SAP Sybase IQ", dated 2013. Retrieved from http://www.sap.com/bin/sapcom/en_us/downloadasset.2013-06-jun-11-11.maximize-data-value-with-very-large-database-management-by-sap-sybase-iq-pdf.html.
"Microsoft Azure—Managing Access Control Lists (ACLs) for Endpoints by using PowerShell", dated Nov. 12, 2014. Retrieved from https://web.archive.org/web/20150110170715/http://msdn.microsoft.com/en-us/library/azure/dn376543.aspx.
"Oracle Big Data Appliance—Perfect Balance Java API", dated Sep. 20, 2015. Retrieved from https://web.archive.org/web/20131220040005/http://docs.oracle.com/cd/E41604_01/doc.22/e41667/toc.htm.
"Oracle Big Data Appliance—X5-2", dated Sep. 6, 2015. Retrieved from https://web.archive.org/web/20150906185409/http://www.oracle.com/technetwork/database/bigdata-appliance/overview/bigdataappliance-datasheet-1883358.pdf.
"Oracle Big Data Appliance Software User's Guide", dated Feb. 2015. Retrieved from https://docs.oracle.com/cd/E55905_01/doc.40/e55814.pdf.
"SAP HANA Administration Guide", dated Mar. 29, 2016, pp. 290-294. Retrieved from https://web.archive.org/web/20160417053656/http://help.sap.com/hana/SAP_HANA_Administration_Guide_en.pdf.
"Sophia Database—Architecture", dated Jan. 18, 2016. Retrieved from https://web.archive.org/web/20160118052919/http://sphia.org/architecture.html.
"Tracking Data Changes", SQL Server 2008 R2, dated Sep. 22, 2015. Retreived from https://web.archive.org/web/20150922000614/https://technet.microsoft.com/en-us/library/bb933994(v=sql.105).aspx.
"Use Formula AutoComplete", dated 2010. Retrieved from https://support.office.com/en-us/article/Use-Formula-AutoComplete-c7c46fa6-3a94-4150-a2f7-34140c1ee4d9 (last accessed Jun. 16, 2016).
Adelfio et al. "Schema Extraction for Tabular Data on the Web", Proceedings of the VLDB Endowment, vol. 6, No. 6. Apr. 2013. Retrieved from http://www.cs.umd.edu/~hjs/pubs/spreadsheets-vldb13.pdf.
Borror, Jefferey A. "Q for Mortals 2.0", dated Nov. 1, 2011. Retrieved from http://code.kx.com/wiki/JB:QforMortals2/contents.
Cheusheva, Svetlana. "How to change the row color based on a cell's value in Excel", dated Oct. 29, 2013. Retrieved from https://www.ablebits.com/office-addins-blog/2013/10/29/excel-change-row-background-color/ (last accessed Jun. 16, 2016).
Corrected Notice of Allowability dated Mar. 10, 2017, in U.S. Appl. No. 15/154,979.
Ex Parte Quayle Action mailed Aug. 8, 2016, in U.S. Appl. No. 15/154,999.
Final Office Action dated Dec. 19, 2016, in U.S. Appl. No. 15/154,995.
Final Office Action dated Feb. 24, 2017, in U.S. Appl. No. 15/154,993.
Final Office Action dated Jan. 27, 2017, in U.S. Appl. No. 15/154,980.
Final Office Action dated Jan. 31, 2017, in U.S. Appl. No. 15/154,996.
Final Office Action dated Mar. 1, 2017, in U.S. Appl. No. 15/154,975.
Final Office Action dated Mar. 13, 2017, in U.S. Appl. No. 15/155,012.
Gai, Lei et al. "An Efficient Summary Graph Driven Method for RDF Query Processing", dated Oct. 27, 2015. Retrieved from http://arxiv.org/pdf/1510.07749.pdf.

International Search Report and Written Opinion dated Aug. 18, 2016, in International Appln. No. PCT/US2016/032582 filed May 14, 2016.
International Search Report and Written Opinion dated Aug. 18, 2016, in International Appln. No. PCT/US2016/032584 filed May 14, 2016.
International Search Report and Written Opinion dated Aug. 18, 2016, in International Appln. No. PCT/US2016/032588 filed May 14, 2016.
International Search Report and Written Opinion dated Aug. 18, 2016, in International Appln. No. PCT/US2016/032593 filed May 14, 2016.
International Search Report and Written Opinion dated Aug. 18, 2016, in International Appln. No. PCT/US2016/032597 filed May 14, 2016.
International Search Report and Written Opinion dated Aug. 18, 2016, in International Appln. No. PCT/US2016/032599 filed May 14, 2016.
International Search Report and Written Opinion dated Aug. 18, 2016, in International Appln. No. PCT/US2016/032605 filed May 14, 2016.
International Search Report and Written Opinion dated Aug. 25, 2016, in International Appln. No. PCT/US2016/032590 filed May 14, 2016.
International Search Report and Written Opinion dated Aug. 25, 2016, in International Appln. No. PCT/US2016/032592 filed May 14, 2016.
International Search Report and Written Opinion dated Aug. 4, 2016, in International Appln. No. PCT/US2016/032581 filed May 14, 2016.
International Search Report and Written Opinion dated Jul. 28, 2016, in International Appln. No. PCT/US2016/032586 filed May 14, 2016.
International Search Report and Written Opinion dated Jul. 28, 2016, in International Appln. No. PCT/US2016/032587 filed May 14, 2016.
International Search Report and Written Opinion dated Jul. 28, 2016, in International Appln. No. PCT/US2016/032589 filed May 14, 2016.
International Search Report and Written Opinion dated Sep. 1, 2016, in International Appln. No. PCT/US2016/032596 filed May 14, 2016.
International Search Report and Written Opinion dated Sep. 1, 2016, in International Appln. No. PCT/US2016/032598 filed May 14, 2016.
International Search Report and Written Opinion dated Sep. 1, 2016, in International Appln. No. PCT/US2016/032601 filed May 14, 2016.
International Search Report and Written Opinion dated Sep. 1, 2016, in International Appln. No. PCT/US2016/032602 filed May 14, 2016.
International Search Report and Written Opinion dated Sep. 1, 2016, in International Appln. No. PCT/US2016/032607 filed May 14, 2016.
International Search Report and Written Opinion dated Sep. 15, 2016, in International Appln. No. PCT/US2016/032591 filed May 14, 2016.
International Search Report and Written Opinion dated Sep. 15, 2016, in International Appln. No. PCT/US2016/032594 filed May 14, 2016.
International Search Report and Written Opinion dated Sep. 15, 2016, in International Appln. No. PCT/US2016/032600 filed May 14, 2016.
International Search Report and Written Opinion dated Sep. 29, 2016, in International Appln. No. PCT/US2016/032595 filed May 14, 2016.
International Search Report and Written Opinion dated Sep. 29, 2016, in International Appln. No. PCT/US2016/032606 filed May 14, 2016.
International Search Report and Written Opinion dated Sep. 8, 2016, in International Appln. No. PCT/US2016/032603 filed May 14, 2016.

(56) References Cited

OTHER PUBLICATIONS

International Search Report and Written Opinion dated Sep. 8, 2016, in International Appln. No. PCT/US2016/032604 filed May 14, 2016.
Jellema, Lucas. "Implementing Cell Highlighting in JSF-based Rich Enterprise Apps (Part 1)", dated Nov. 2008. Retrieved from http://www.oracle.com/technetwork/articles/adf/jellema-adfcellhighlighting-087850.html (last accessed Jun. 16, 2016).
Lou, Yuan. "A Multi-Agent Decision Support System for Stock Trading", IEEE Network, Jan./Feb. 2002. Retreived from http://www.reading.ac.uk/AcaDepts/si/sisweb13/ais/papers/journal12-A%20multi-agent%20Framework.pdf.
Mallet, "Relational Database Support for Spatio-Temporal Data", Technical Report TR 04-21, Sep. 2004, University of Alberta, Department of Computing Science.
Mariyappan, Balakrishnan. "10 Useful Linux Bash_Completion Complete Command Examples (Bash Command Line Completion on Steroids)", dated Dec. 2, 2013. Retrieved from http://www.thegeekstuff.com/2013/12/bash-completion-complete/ (last accessed Jun. 16, 2016).
Murray, Derek G. et al. "Naiad: a timely dataflow system." SOSP '13 Proceedings of the Twenty-Fourth ACM Symposium on Operating Systems Principles. pp. 439-455. Nov. 2013.
Non-final Office Action dated Aug. 12, 2016, in U.S. Appl. No. 15/155,001.
Non-final Office Action dated Aug. 16, 2016, in U.S. Appl. No. 15/154,993.
Non-final Office Action dated Aug. 19, 2016, in U.S. Appl. No. 15/154,991.
Non-final Office Action dated Aug. 25, 2016, in U.S. Appl. No. 15/154,980.
Non-final Office Action dated Aug. 26, 2016, in U.S. Appl. No. 15/154,995.
Non-final Office Action dated Aug. 8, 2016, in U.S. Appl. No. 15/154,983.
Non-final Office Action dated Aug. 8, 2016, in U.S. Appl. No. 15/154,985.
Non-final Office Action dated Feb. 8, 2017, in U.S. Appl. No. 15/154,997.
Non-final Office Action dated Mar. 2, 2017, in U.S. Appl. No. 15/154,984.
Non-final Office Action dated Nov. 17, 2016, in U.S. Appl. No. 15/154,999.
Non-final Office Action dated Oct. 13, 2016, in U.S. Appl. No. 15/155,009.
Non-final Office Action dated Oct. 27, 2016, in U.S. Appl. No. 15/155,006.
Non-final Office Action dated Oct. 7, 2016, in U.S. Appl. No. 15/154,998.
Non-final Office Action dated Sep. 1, 2016, in U.S. Appl. No. 15/154,979.
Non-final Office Action dated Sep. 1, 2016, in U.S. Appl. No. 15/155,011.
Non-final Office Action dated Sep. 1, 2016, in U.S. Appl. No. 15/155,012.
Non-final Office Action dated Sep. 14, 2016, in U.S. Appl. No. 15/154,984.
Non-final Office Action dated Sep. 16, 2016, in U.S. Appl. No. 15/154,988.
Non-final Office Action dated Sep. 22, 2016, in U.S. Appl. No. 15/154,987.
Non-final Office Action dated Sep. 26, 2016, in U.S. Appl. No. 15/155,005.
Non-final Office Action dated Sep. 29, 2016, in U.S. Appl. No. 15/154,990.
Non-final Office Action dated Sep. 8, 2016, in U.S. Appl. No. 15/154,975.
Non-final Office Action dated Sep. 9, 2016, in U.S. Appl. No. 15/154,996.
Non-final Office Action dated Sep. 9, 2016, in U.S. Appl. No. 15/155,010.
Notice of Allowance dated Dec. 19, 2016, in U.S. Appl. No. 15/155,001.
Notice of Allowance dated Dec. 22, 2016, in U.S. Appl. No. 15/155,011.
Notice of Allowance dated Dec. 7, 2016, in U.S. Appl. No. 15/154,985.
Notice of Allowance dated Feb. 1, 2017, in U.S. Appl. No. 15/154,988.
Notice of Allowance dated Feb. 14, 2017, in U.S. Appl. No. 15/154,979.
Notice of Allowance dated Feb. 28, 2017, in U.S. Appl. No. 15/154,990.
Notice of Allowance dated Jan. 30, 2017, in U.S. Appl. No. 15/154,987.
Notice of Allowance dated Mar. 2, 2017, in U.S. Appl. No. 15/154,998.
Notice of Allowance dated Nov. 17, 2016, in U.S. Appl. No. 15/154,991.
Notice of Allowance dated Nov. 21, 2016, in U.S. Appl. No. 15/154,983.
Notice of Allowance dated Nov. 8, 2016, in U.S. Appl. No. 15/155,007.
Notice of Allowance dated Oct. 11, 2016, in U.S. Appl. No. 15/155,007.
Notice of Allowance dated Oct. 21, 2016, in U.S. Appl. No. 15/154,999.
Palpanas, Themistoklis et al. "Incremental Maintenance for Non-Distributive Aggregate Functions", Proceedings of the 28th VLDB Conference, 2002. Retreived from http://www.vldb.org/conf/2002/S22P04.pdf.
PowerShell Team, Intellisense in Windows PowerShell ISE 3.0, dated Jun. 12, 2012, Windows PowerShell Blog, pp. 1-6 Retrieved: https://biogs.msdn.microsoft.com/powershell/2012/06/12/intellisense-in-windows-powershell-ise-3-0/.
Smith, Ian. "Guide to Using SQL: Computed and Automatic Columns." Rdb Jornal, dated Sep. 2008, retrieved Aug. 15, 2016, retrieved from the Internet <URL: http://www.oracle.com/technetwork/products/rdb/automatic-columns-132042.pdf>.
Wes McKinney & PyData Development Team. "pandas: powerful Python data analysis toolkit, Release 0.16.1" Dated May 11, 2015. Retrieved from: http://pandas.pydata.org/pandas-docs/version/0.16.1/index.html.
Wes McKinney & PyData Development Team. "pandas: powerful Python data analysis toolkit, Release 0.18.1" Dated May 3, 2016. Retrieved from: http://pandas.pydata.org/pandas-docs/version/0.18.1/index.html.
Wu, Buwen et al. "Scalable SPARQL Querying using Path Partitioning", 31st IEEE International Conference on Data Engineering (ICDE 2015), Seoul, Korea, Apr. 13-17, 2015. Retreived from http://imada.sdu.dk/~zhou/papers/icde2015.pdf.
Notice of Allowance dated Jun. 20, 2017, in U.S. Appl. No. 15/154,975.
Notice of Allowance dated Mar. 1, 2018, in U.S. Appl. No. 15/464,314.
Notice of Allowance dated Mar. 31, 2017, in U.S. Appl. No. 15/154,998.
Notice of Allowance dated May 10, 2017, in U.S. Appl. No. 15/154,988.
Notice of Allowance dated May 4, 2018, in U.S. Appl. No. 15/897,547.
Notice of Allowance dated Nov. 17, 2017, in U.S. Appl. No. 15/154,993.
Notice of Allowance dated Oct. 6, 2017, in U.S. Appl. No. 15/610,162.
Sobell, Mark G. "A Practical Guide to Linux, Commands, Editors and Shell Programming." Third Edition, dated Sep. 14, 2012. Retrieved from: http://techbus.safaribooksonline.com/book/operating-systems-and-server-administration/linux/9780133085129.
Notice of Allowance dated Sep. 11, 2018, in U.S. Appl. No. 15/608,963.
Advisory Action dated Apr. 19, 2017, in U.S. Appl. No. 15/154,999.
Advisory Action dated Apr. 20, 2017, in U.S. Appl. No. 15/154,980.
Advisory Action dated Apr. 6, 2017, in U.S. Appl. No. 15/154,995.
Advisory Action dated Dec. 21, 2017, in U.S. Appl. No. 15/154,984.

(56) References Cited

OTHER PUBLICATIONS

Advisory Action dated Mar. 31, 2017, in U.S. Appl. No. 15/154,996.
Advisory Action dated May 3, 2017, in U.S. Appl. No. 15/154,993.
Breitbart, Update Propagation Protocols for Replicated Databases, SIGMOD '99 Philadelphia PA, 1999, pp. 97-108.
Corrected Notice of Allowability dated Aug. 9, 2017, in U.S. Appl. No. 15/154,980.
Corrected Notice of Allowability dated Jul. 31, 2017, in U.S. Appl. No. 15/154,999.
Corrected Notice of Allowability dated Oct. 26, 2017, in U.S. Appl. No. 15/610,162.
Decision on Pre-Appeal Conference Request dated Nov. 20, 2017, in U.S. Appl. No. 15/154,997.
Final Office Action dated Apr. 10, 2017, in U.S. Appl. No. 15/155,006.
Final Office Action dated Aug. 10, 2018, in U.S. Appl. No. 15/796,230.
Final Office Action dated Aug. 2, 2018, in U.S. Appl. No. 15/154,996.
Final Office Action dated Aug. 28, 2018, in U.S. Appl. No. 15/813,119.
Final Office Action dated Dec. 29, 2017, in U.S. Appl. No. 15/154,974.
Final Office Action dated Jul. 27, 2017, in U.S. Appl. No. 15/154,993.
Final Office Action dated Jun. 18, 2018, in U.S. Appl. No. 15/155,005.
Final Office Action dated Jun. 23, 2017, in U.S. Appl. No. 15/154,997.
Final Office Action dated Mar. 31, 2017, in U.S. Appl. No. 15/155,005.
Final Office Action dated May 15, 2017, in U.S. Appl. No. 15/155,010.
Final Office Action dated May 18, 2018, in U.S. Appl. No. 15/654,461.
Final Office Action dated May 4, 2017, in U.S. Appl. No. 15/155,009.
Kramer, The Combining DAG: A Technique for Parallel Data Flow Analysis, IEEE Transactions on Parallel and Distributed Systems, vol. 5, No. 8, Aug. 1994, pp. 805-813.
Non-final Office Action dated Apr. 12, 2018, in U.S. Appl. No. 15/154,997.
Non-final Office Action dated Apr. 19, 2017, in U.S. Appl. No. 15/154,974.
Non-final Office Action dated Apr. 23, 2018, in U.S. Appl. No. 15/813,127.
Non-final Office Action dated Apr. 5, 2018, in U.S. Appl. No. 15/154,984.
Non-final Office Action dated Aug. 10, 2018, in U.S. Appl. No. 16/004,578.
Non-final Office Action dated Aug. 14, 2017, in U.S. Appl. No. 15/464,314.
Non-final Office Action dated Dec. 13, 2017, in U.S. Appl. No. 15/608,963.
Non-final Office Action dated Dec. 28, 2017, in U.S. Appl. No. 15/154,996.
Non-final Office Action dated Dec. 28, 2017, in U.S. Appl. No. 15/796,230.
Non-final Office Action dated Feb. 15, 2018, in U.S. Appl. No. 15/813,112.
Non-final Office Action dated Feb. 28, 2018, in U.S. Appl. No. 15/813,119.
Non-final Office Action dated Jan. 4, 2018, in U.S. Appl. No. 15/583,777.
Non-final Office Action dated Jul. 27, 2017, in U.S. Appl. No. 15/154,995.
Non-final Office Action dated Jun. 29, 2018, in U.S. Appl. No. 15/154,974.
Non-final Office Action dated Jun. 8, 2018, in U.S. Appl. No. 15/452,574.
Non-final Office Action dated Mar. 20, 2018, in U.S. Appl. No. 15/155,006.
Non-final Office Action dated Nov. 15, 2017, in U.S. Appl. No. 15/654,461.
Non-final Office Action dated Nov. 21, 2017, in U.S. Appl. No. 15/155,005.
Non-final Office Action dated Nov. 30, 2017, in U.S. Appl. No. 15/155,012.
Non-final Office Action dated Oct. 5, 2017, in U.S. Appl. No. 15/428,145.
Notice of Allowance dated Apr. 30, 2018, in U.S. Appl. No. 15/155,012.
Notice of Allowance dated Feb. 12, 2018, in U.S. Appl. No. 15/813,142.
Notice of Allowance dated Feb. 26, 2018, in U.S. Appl. No. 15/428,145.
Notice of Allowance dated Jul. 11, 2018, in U.S. Appl. No. 15/154,995.
Notice of Allowance dated Jul. 28, 2017, in U.S. Appl. No. 15/155,009.
Notice of Allowance dated Jun. 19, 2017, in U.S. Appl. No. 15/154,980.

\* cited by examiner

| User-Group Table 600 ||
|---|---|
| USER 602 | SECURITY GROUP 604 |
| Chuck | Chuck |
| Chuck | Allusers |
| Carlos | Carlos |
| Carlos | Allusers |
| Carlos | Developers |

FIG. 6

| Data Source Specific Access Control [IS THERE A BETTER NAME FOR THIS TABLE] 700 ||||
|---|---|---|---|
| SECURITY GROUP 702 | TABLE NAMESPACE 704 | TABLE NAME 706 | FILTER GENERATOR 708 |
| Allusers | * | * | * |
| Allusers | ACCOUNT_DB | * | NO_ACCESS |
| Allusers | MAIN_DB | * | WhereClause (parameters 1) |
| Allusers | MAIN_DB | Shipments | WhereClause (parameters 2) |
| Developers | MAIN_DB | Shipments | WhereClause (parameter 3) |
| Developers | MAIN_DB | Shipments | WhereClause (parameter 4) |
| Developers | ACCOUNT_DB | * | WhereClause (parameter 1) |
| SysAdmin | ACCOUNT_DB | Account_Map | * |
| SuperUser | * | * | * |

FIG. 7

DATA STORE ACCESS PERMISSION SYSTEM WITH INTERLEAVED APPLICATION OF DEFERRED ACCESS CONTROL FILTERS

This application claims the benefit of U.S. Provisional Application No. 62/161,813, entitled "Computer Data System" and filed on May 14, 2015, which is incorporated herein by reference in its entirety.

Embodiments relate generally to computer database systems and computer networks, and more particularly, to methods, systems and computer readable media for limiting user access to data through the application of data access controls.

Many systems control user access to data based on a user group or a user role. These systems apply these controls based on an access list and not on the operation being used to access the data. Also, the access control is applied to a large data source without regards to smaller subsets of data within the large data source. Normally, applying access controls to large data sources with a broad brush incurs a higher performance cost. This extra cost is especially evident when the user is applying a filtering operation, such as a where clause, to gain access to a smaller set of data, but the security measures are applied to the large data source before the filtering operation. A need may exist for interleaving generated access control filters based on the type of operation requested with data store structure-based access filters to achieve high performance while keeping the data secure.

Embodiments were conceived in light of the above mentioned needs, problems and/or limitations, among other things.

Some implementations can include a system for automatically applying access control deferred filters to a first table object, the system comprising one or more hardware processors, a computer readable data storage device coupled to the one or more hardware processors, the computer readable data storage device having stored thereon software instructions that, when executed by the one or more hardware processors, cause the one or more hardware processors to perform operations. The operations can include receiving a user request submitted from a computing device for data from the first table object. The operations can also include requesting from an access control list source stored in a computer medium, access control groups for the user. The operations can further include requesting from an access control filter source in the computer medium, a set of filter generators for each access control group. The operation can also include determining for each set of filter generators for each access control group, a most specific filter generator based on metadata for the first table object for identifying a computer medium source of the first table object data. The operations can include for each most specific filter generator, executing the specific filter generator to create a filter for the first table object. The operations can also include combining each of the generated filters for the first table object into an access control deferred filter. The operations can include creating a second table object in memory that references the first table object. The operations can also include associating an access control deferred filter with the second table. The operations can further include making the second table object available for user operations.

The operations can include receiving a user request from a computing device to perform a filtering operation on the second table object. The operations can also include accessing the metadata of the second table object. The operations can further include retrieving a tree-based table storage structure from the metadata. The operations can also include traversing the tree-based table storage structure starting at a table root of the tree-based table storage structure. The operations can include when the user request requests data from one or more partition columns of the tree-based table storage structure, applying one or more partition column filters based on a partition column structure of the tree. The operations can also include when the user request contains a filtering operation for one or more grouping columns of the tree-based table storage structure, in a first pass, executing user-specified filters on the one or more partition columns that execute only system-specified code, and between the first and a second pass, applying internal access-control filters, thereby removing all rows for which the user does not have authorized access by retrieving the access control deferred filter from the metadata, extracting access control filters from the access control deferred filter that apply to the access control groups for the user, and choosing a least restrictive access control filter from the extracted access control filters. The operations can further include applying the least restrictive access control filter to the user request. The operations can also include applying on the second pass one or more second grouping column filters based on a first filter request contained in the user request. The operations can include applying one or more normal filters contained in the user request to identify a filtered data source result. The operations can also include returning the final set of data.

The operations can include wherein the access control deferred filter includes an access control disjunctive filter.

The operations can also include wherein the access control deferred filter includes an access control conjunctive filter.

The operations can include receiving a user request from a computing device to perform a data access operation on the second table object. The operations can also include accessing the metadata of the second table object. The operations can also include retrieving a tree-based table storage structure from the metadata. The operations can further include traversing the tree-based table storage structure starting at a table root of the tree-based table storage structure. The operations can also include when the user request requests data from one or more columns of the tree-based table storage structure, applying internal access-control filters, thereby removing all rows for which the user does not have authorized access by retrieving the access control deferred filter from the metadata, extracting access control filters from the access control deferred filter that apply to the access control groups for the user, and choosing a least restrictive access control filter from the extracted access control filters. The operations can also include applying the least restrictive access control filter to the user request. The operations can include applying the specified user operation. The operations can also include returning the final set of data.

Some implementations can include a method for applying access control deferred filters to a first table object in a computer medium, the method comprising receiving a user request submitted from a computing device for data from the first table object. The method can also include requesting from an access control list source stored in a computer medium, access control groups for the user. The method can further include requesting from an access control filter source in the computer medium, a set of filter generators for each access control group. The method can also include determining for each set of filter generators for each access control group, a most specific filter generator based on metadata for the first table object for identifying a computer medium source of the first table object data. The method can include for each most specific filter generator, executing the specific filter generator to create a filter for the first table object. The method can also include combining each of the generated filters for the first table object into an access control deferred filter. The method can also include creating a second table object in memory that references the first table object. The method can further include associating an access control deferred filter with the second table. The method can also include making the second table object available for user operations.

The method can also include receiving a user request from a computing device to perform a filtering operation on the second table object. The method can include accessing the metadata of the second table object. The method can also include retrieving a tree-based table storage structure from the metadata. The method can further include traversing the tree-based table storage structure starting at a table root of the tree-based table storage structure. The method can also include when the user request requests data from one or more partition columns of the tree-based table storage structure, applying one or more partition column filters based on a partition column structure of the tree. The method can also include when the user request contains a filtering operation for one or more grouping columns of the tree-based table storage structure, in a first pass, executing user-specified filters on the one or more partition columns that execute only system-specified code, and on a second pass, applying internal access-control filters, thereby removing all rows for which the user does not have authorized access. The method can include retrieving the access control deferred filter from the metadata. The method can also include extracting access control filters from the access control deferred filter that apply to the access control groups for the user. The method can also include choosing a least restrictive access control filter from the extracted access control filters. The method can further include applying the least restrictive access control filter to the user request. The method can also include applying one or more second grouping column filters based on a first filter request contained in the user request. The method can include applying one or more normal filters contained in the user request to identify a filtered data source result. The method can also include returning the final set of data.

The method can include wherein the access control deferred filter includes an access control disjunctive filter.

The method can include wherein the access control deferred filter includes an access control conjunctive filter.

The method can include receiving a user request from a computing device to perform a data access operation on the second table object. The method can also include accessing the metadata of the second table object. The method can further include retrieving a tree-based table storage structure from the metadata. The method can also include traversing the tree-based table storage structure starting at a table root of the tree-based table storage structure. The method can further include when the user request requests data from one or more columns of the tree-based table storage structure, applying internal access-control filters, thereby removing all rows for which the user does not have authorized access by retrieving the access control deferred filter from the metadata, extracting access control filters from the access control deferred filter that apply to the access control groups for the user, and choosing a least restrictive access control filter from the extracted access control filters. The method can also include applying the least restrictive access control filter to the user request. The method can include applying the specified user operation. The method can also include returning the final set of data.

Some implementations can include a nontransitory computer readable medium having stored thereon software instructions that, when executed by one or more processors, cause the one or more processors to perform operations. The operations can include receiving a user request submitted from a computing device for data from the first table object. The operations can also include requesting from an access control list source stored in a computer medium, access control groups for the user. The operations can include requesting from an an access control filter source in the computer medium, a set of filter generators for each access control group. The operations can also include determining for each set of filter generators for each access control group, a most specific filter generator based on metadata for the first table object for identifying a computer medium source of the first table object data. The operations can include for each most specific filter generator, executing the specific filter generator to create a filter for the first table object. The operations can also include combining each of the generated filters for the first table object into an access control deferred filter. The operations can further include creating a second table object in memory that references the first table object. The operations can also include associating an access control deferred filter with the second table. The operation can include making the second table object available for user operations.

The operations can include receiving a user request from a computing device to perform a filtering operation on the second table object. The operations can also include accessing the metadata of the second table object. The operations can further include retrieving a tree-based table storage structure from the metadata. The operations can also include traversing the tree-based table storage structure starting at a table root of the tree-based table storage structure. The operations can include if the user request requests data from one or more partition columns of the tree-based table storage structure, applying one or more partition column filters based on a partition column structure of the tree. The operations can also include if the user request contains a filtering operation for one or more grouping columns of the tree-based table storage structure, in a first pass, executing user-specified filters on the one or more partition columns that execute only system-specified code, and on a second pass, applying internal access-control filters, thereby removing all rows for which the user does not have authorized access. The operations can include retrieving the access control deferred filter from the metadata. The operations can also include extracting access control filters from the access control deferred filter that apply to the access control groups for the user. The operations can include choosing a least restrictive access control filter from the extracted access control filters. The operations can further include applying the least restrictive access control filter to the user request. The operations can also include applying one or more second grouping column filters based on a first filter request contained in the user request. The operations can include applying one or more normal filters contained in the user request to identify a filtered data source result. The operations can also include returning the final set of data.

The operations can include wherein the access control deferred filter includes an access control disjunctive filter.

The operations can include wherein the access control deferred filter includes an access control conjunctive filter.

The operations can include receiving a user request from a computing device to perform a data access operation on the second table object. The operations can also include accessing the metadata of the second table object. The operations can include retrieving a tree-based table storage structure from the metadata. The operations can further include traversing the tree-based table storage structure starting at a table root of the tree-based table storage structure. The operations can also include when the user request requests data from one or more columns of the tree-based table storage structure, applying internal access-control filters, thereby removing all rows for which the user does not have authorized access by retrieving the access control deferred filter from the metadata, extracting access control filters from the access control deferred filter that apply to the access control groups for the user and choosing a least restrictive access control filter from the extracted access control filters. The operations can also include applying the least restrictive access control filter to the user request. The operations can further include applying the specified user operation. The operations can also include returning the final set of data.

BRIEF DESCRIPTION OF THE DRAWINGS

FIG. 6 is a diagram of a users matched with groups in order to determine the user's group data access privileges in accordance with some implementations.

FIG. 7 is a diagram of privileges granted to particular user groups for data in accordance with some implementations.

DETAILED DESCRIPTION

Reference is made herein to the Java programming language, Java classes, Java bytecode and the Java Virtual Machine (JVM) for purposes of illustrating example implementations. It will be appreciated that implementations can include other programming languages (e.g., groovy, Scala, R, Go, etc.), other programming language structures as an alternative to or in addition to Java classes (e.g., other language classes, objects, data structures, program units, code portions, script portions, etc.), other types of bytecode, object code and/or executable code, and/or other virtual machines or hardware implemented machines configured to execute a data system query.

Figure 1:
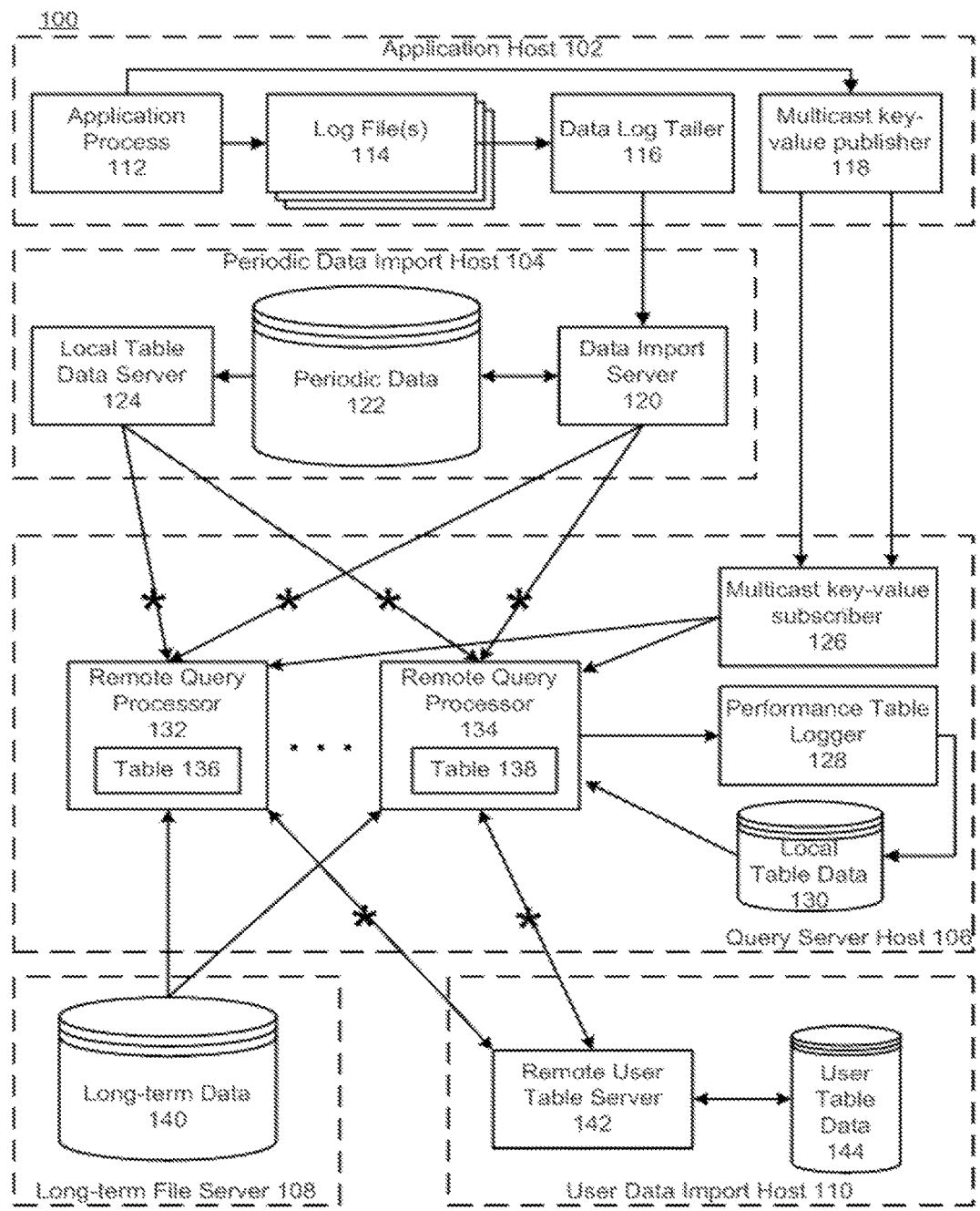
FIG. 1 is a diagram of an example computer data system showing an example data distribution configuration in accordance with some implementations.
Figure 2:
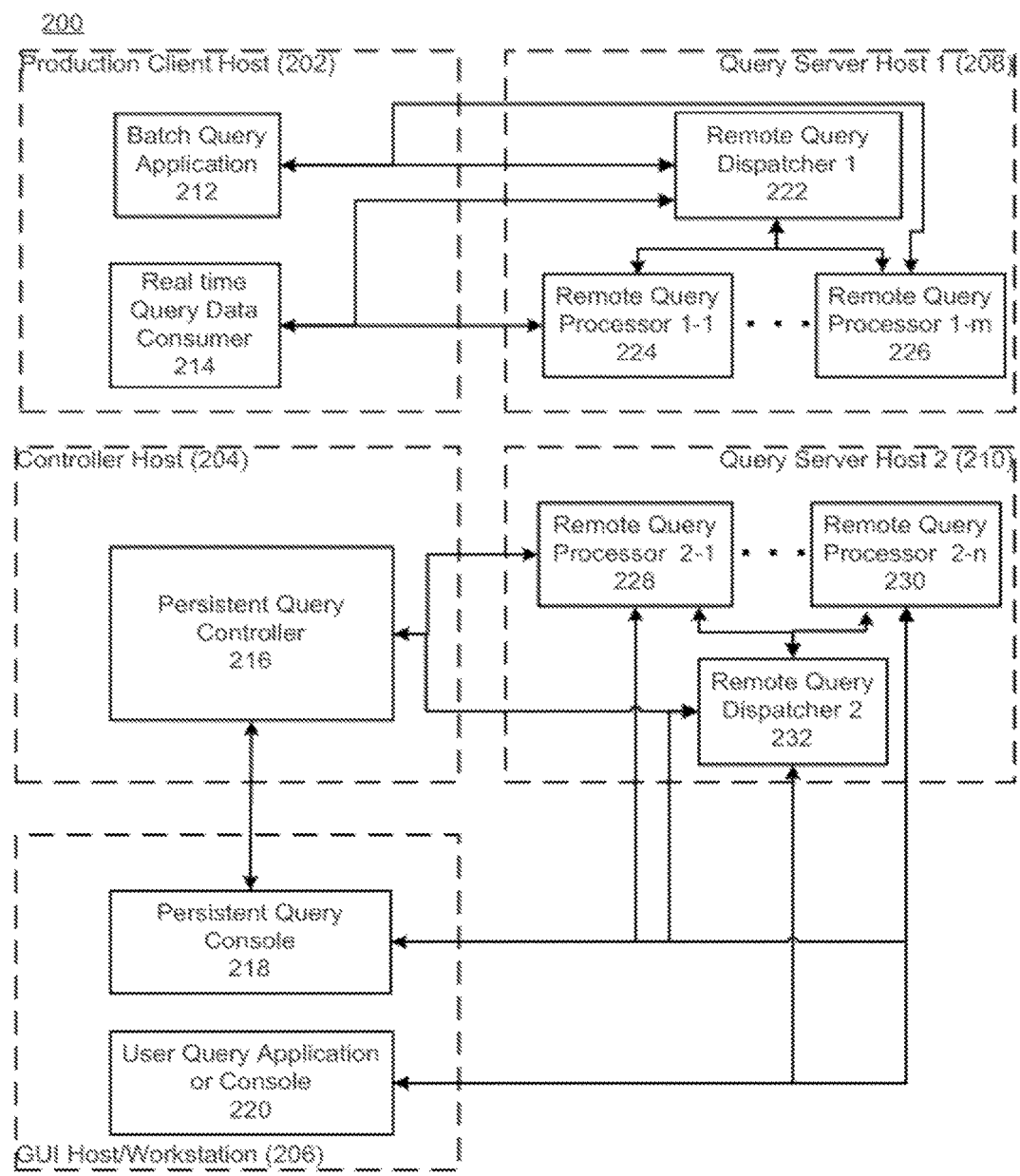
FIG. 2 is a diagram of an example computer data system showing an example administration/process control arrangement in accordance with some implementations.

FIG. 1 is a diagram of an example computer data system and network 100 showing an example data distribution configuration in accordance with some implementations. In particular, the system 100 includes an application host 102, a periodic data import host 104, a query server host 106, a long-term file server 108, and a user data import host 110. While tables are used as an example data object in the description below, it will be appreciated that the data system described herein can also process other data objects such as mathematical objects (e.g., a singular value decomposition of values in a given range of one or more rows and columns of a table), TableMap objects, etc. A TableMap object provides the ability to lookup a Table by some key. This key represents a unique value (or unique tuple of values) from the columns aggregated on in a byExternal( ) statement execution, for example. A TableMap object is can be the result of a byExternal( ) statement executed as part of a query. It will also be appreciated that the configurations shown in FIGS. 1 and 2 are for illustration purposes and in a given implementation each data pool (or data store) may be directly attached or may be managed by a file server.

The application host 102 can include one or more application processes 112, one or more log files 114 (e.g., sequential, row-oriented log files), one or more data log tailers 116 and a multicast key-value publisher 118. The periodic data import host 104 can include a local table data server, direct or remote connection to a periodic table data store 122 (e.g., a column-oriented table data store) and a data import server 120. The query server host 106 can include a multicast key-value subscriber 126, a performance table logger 128, local table data store 130 and one or more remote query processors (132, 134) each accessing one or more respective tables (136, 138). The long-term file server 108 can include a long-term data store 140. The user data import host 110 can include a remote user table server 142 and a user table data store 144. Row-oriented log files and column-oriented table data stores are discussed herein for illustration purposes and are not intended to be limiting. It will be appreciated that log files and/or data stores may be configured in other ways. In general, any data stores discussed herein could be configured in a manner suitable for a contemplated implementation.

In operation, the input data application process 112 can be configured to receive input data from a source (e.g., a securities trading data source), apply schema-specified, generated code to format the logged data as it's being prepared for output to the log file 114 and store the received data in the sequential, row-oriented log file 114 via an optional data logging process. In some implementations, the data logging process can include a daemon, or background process task, that is configured to log raw input data received from the application process 112 to the sequential, row-oriented log files on disk and/or a shared memory queue (e.g., for sending data to the multicast publisher 118). Logging raw input data to log files can additionally serve to provide a backup copy of data that can be used in the event that downstream processing of the input data is halted or interrupted or otherwise becomes unreliable.

A data log tailer 116 can be configured to access the sequential, row-oriented log file(s) 114 to retrieve input data logged by the data logging process. In some implementations, the data log tailer 116 can be configured to perform strict byte reading and transmission (e.g., to the data import server 120). The data import server 120 can be configured to store the input data into one or more corresponding data stores such as the periodic table data store 122 in a column-oriented configuration. The periodic table data store 122 can be used to store data that is being received within a time period (e.g., a minute, an hour, a day, etc.) and which may be later processed and stored in a data store of the long-term file server 108. For example, the periodic table data store 122 can include a plurality of data servers configured to store periodic securities trading data according to one or more characteristics of the data (e.g., a data value such as security symbol, the data source such as a given trading exchange, etc.).

The data import server 120 can be configured to receive and store data into the periodic table data store 122 in such a way as to provide a consistent data presentation to other parts of the system. Providing/ensuring consistent data in this context can include, for example, recording logged data to a disk or memory, ensuring rows presented externally are available for consistent reading (e.g., to help ensure that if the system has part of a record, the system has all of the record without any errors), and preserving the order of records from a given data source. If data is presented to clients, such as a remote query processor (132, 134), then the data may be persisted in some fashion (e.g., written to disk).

The local table data server 124 can be configured to retrieve data stored in the periodic table data store 122 and provide the retrieved data to one or more remote query processors (132, 134) via an optional proxy.

The remote user table server (RUTS) 142 can include a centralized consistent data writer, as well as a data server that provides processors with consistent access to the data that it is responsible for managing. For example, users can provide input to the system by writing table data that is then consumed by query processors.

The remote query processors (132, 134) can use data from the data import server 120, local table data server 124 and/or from the long-term file server 108 to perform queries. The remote query processors (132, 134) can also receive data from the multicast key-value subscriber 126, which receives data from the multicast key-value publisher 118 in the application host 102. The performance table logger 128 can log performance information about each remote query processor and its respective queries into a local table data store 130. Further, the remote query processors can also read data from the RUTS, from local table data written by the performance logger, or from user table data read over NFS.

It will be appreciated that the configuration shown in FIG. 1 is a typical example configuration that may be somewhat idealized for illustration purposes. An actual configuration may include one or more of each server and/or host type. The hosts/servers shown in FIG. 1 (e.g., 102-110, 120, 124 and 142) may each be separate or two or more servers may be combined into one or more combined server systems. Data stores can include local/remote, shared/isolated and/or redundant. Any table data may flow through optional proxies indicated by an asterisk on certain connections to the remote query processors. Also, it will be appreciated that the term "periodic" is being used for illustration purposes and can include, but is not limited to, data that has been received within a given time period (e.g., millisecond, second, minute, hour, day, week, month, year, etc.) and which has not yet been stored to a long-term data store (e.g., 140).

FIG. 2 is a diagram of an example computer data system 200 showing an example administration/process control arrangement in accordance with some implementations. The system 200 includes a production client host 202, a controller host 204, a GUI host or workstation 206, and query server hosts 208 and 210. It will be appreciated that there may be one or more of each of 202-210 in a given implementation.

The production client host 202 can include a batch query application 212 (e.g., a query that is executed from a command line interface or the like) and a real time query data consumer process 214 (e.g., an application that connects to and listens to tables created from the execution of a separate query). The batch query application 212 and the real time query data consumer 214 can connect to a remote query dispatcher 222 and one or more remote query processors (224, 226) within the query server host 1 208.

The controller host 204 can include a persistent query controller 216 configured to connect to a remote query dispatcher 232 and one or more remote query processors 228-230. In some implementations, the persistent query controller 216 can serve as the "primary client" for persistent queries and can request remote query processors from dispatchers, and send instructions to start persistent queries. For example, a user can submit a query to 216, and 216 starts and runs the query every day. In another example, a securities trading strategy could be a persistent query. The persistent query controller can start the trading strategy query every morning before the market opened, for instance. It will be appreciated that 216 can work on times other than days. In some implementations, the controller may require its own clients to request that queries be started, stopped, etc. This can be done manually, or by scheduled (e.g., cron) jobs. Some implementations can include "advanced scheduling" (e.g., auto-start/stop/restart, time-based repeat, etc.) within the controller.

The GUI/host workstation can include a user console 218 and a user query application 220. The user console 218 can be configured to connect to the persistent query controller 216. The user query application 220 can be configured to connect to one or more remote query dispatchers (e.g., 232) and one or more remote query processors (228, 230).

Figure 3:
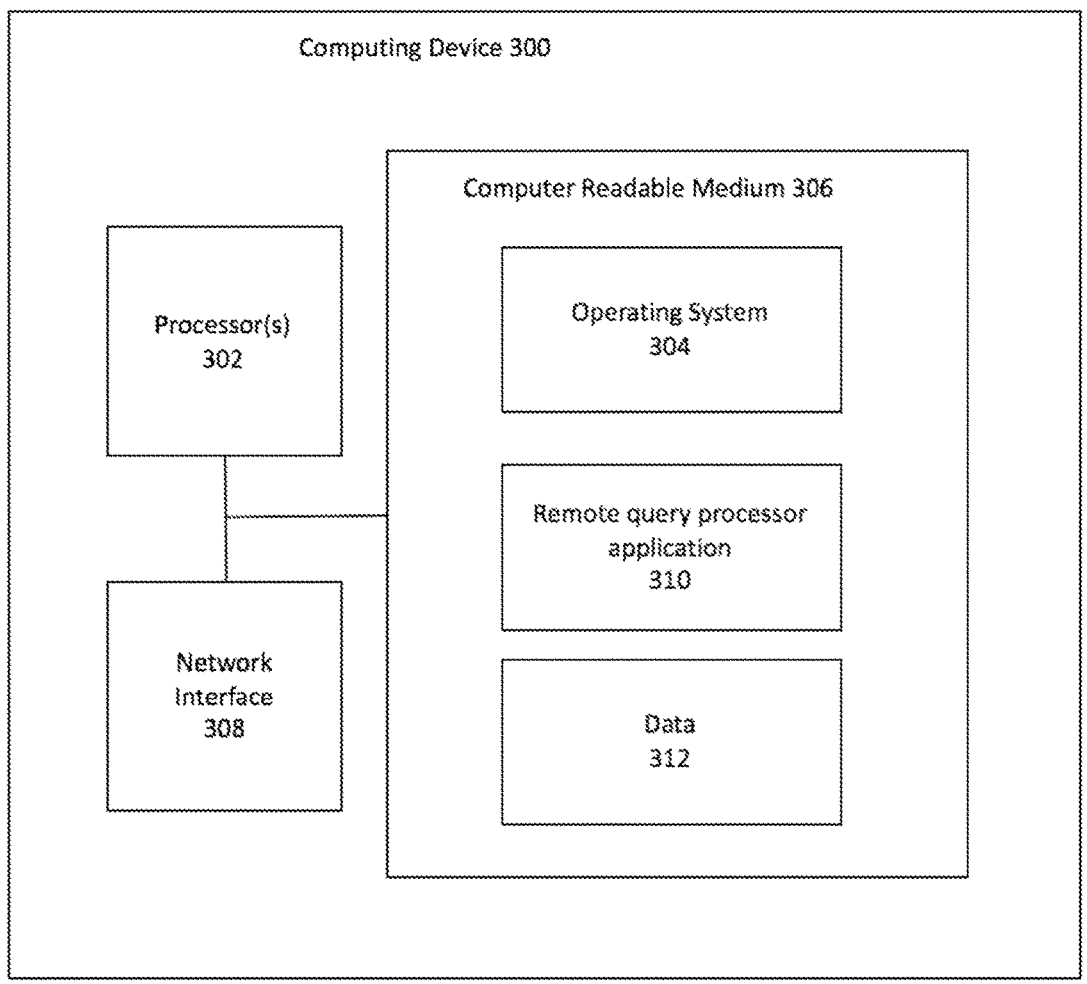
FIG. 3 is a diagram of an example computing device configured for permissions processing in accordance with some implementations.

FIG. 3 is a diagram of an example computing device 300 in accordance with at least one implementation. The computing device 300 includes one or more processors 302, operating system 304, computer readable medium 306 and network interface 308. The memory 306 can include a remote query processor application 310 and a data section 312 (e.g., for storing ASTs, precompiled code, etc.).

In operation, the processor 302 may execute the remote query processor application 310 stored in the memory 306. The remote query processor application 310 can include software instructions that, when executed by the processor, cause the processor to perform operations for executing and updating queries in accordance with the present disclosure (e.g., performing one or more of 502-526, 550-572, 602-612 described below).

The remote query processor application program 310 can operate in conjunction with the data section 312 and the operating system 304.

Figure 4:
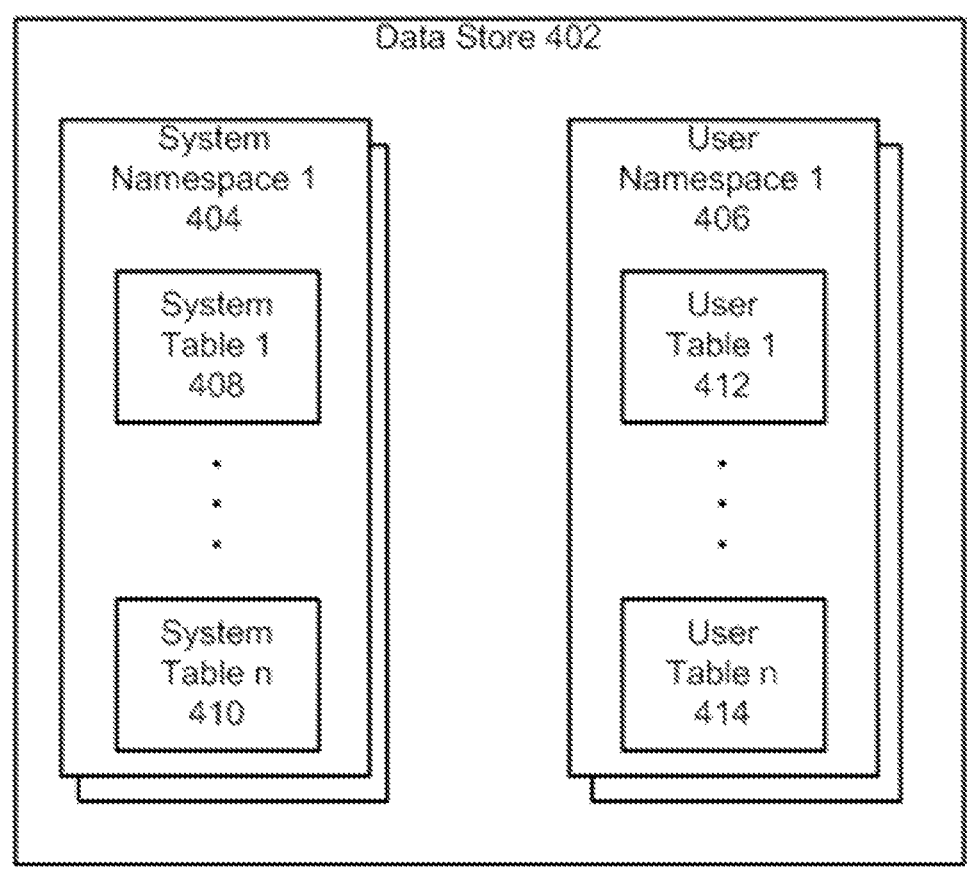
FIG. 4 is a diagram of an example data system namespace arrangement in accordance with some implementations.

FIG. 4 is a diagram of an example data store 402 showing an example namespace arrangement in accordance with some implementations. The data store 402 includes one or more system namespaces 404 and one or more user namespaces 406. A namespace (404, 406) can include directory names, file names, partition names, table names, etc. The system namespace 404 can be used for one or more system tables (408-410). System tables may include tables that may not be modified by a data system user (e.g., intraday securities trading data and historical securities trading data). The user namespace 406 can be used for one or more user tables (412-414) that may be modified by a user. A data source or data object can be referenced in the data system via a combination of namespace and data object name.

A data object (such as a table) within the computer data system can include a definition that provides information used to access and/or modify the data object. The data object definition information can include a namespace, a data object name (e.g., a table name), and an ordered list of column definitions. Each column definition can include one or more of a column name, a column type (e.g., partitioning, grouping, normal, etc.), data type, component type (for arrays), and storage hint information for columns having variable sized or encoded data.

Figure 5A:
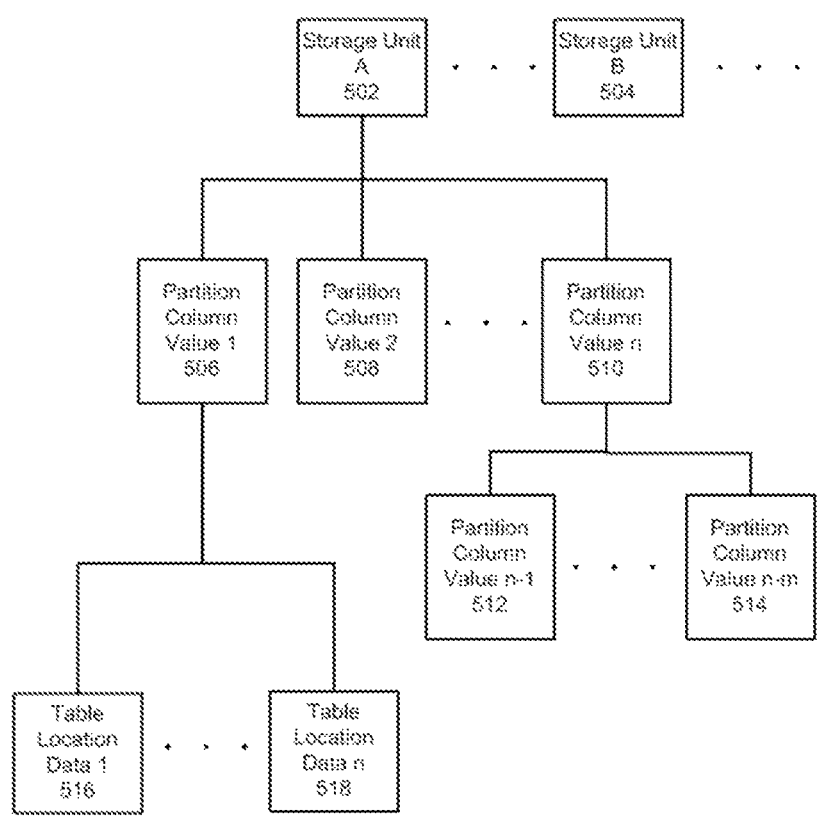
FIGS. 5A and 5B are diagrams of an example data object storage configurations in accordance with some implementations.

FIG. 5A is a diagram of an example data storage configuration 500 for a computer data system in accordance with some implementations. In particular, the data storage configuration 500 is a hierarchical filesystem-based configuration having one or more storage units (502, 504) with each storage unit having zero or more partitioning column values (506-510). A namespace can be used as a "starting point" for evaluation of a formula that accesses data stored in the computer data system. A partitioning column value can have one or more sub-layers (512, 514). A partitioning column value can include a value such as a date (e.g., Partition Column value 1 could be "2016-05-01", Partition Column value 2 could be "2016-05-05", etc.).

Each partition column value (e.g., 506-510) can include zero or more table location data values (516, 518). The table location data can include a table location key comprised of a prefix and a partition column value. For example, table location data 1 516 could have a table location key of "A/2016-05-01", which can refer to a prefix of "A" (e.g., a security symbol of "A") and the partition column value of the date "2016-05-01." While a tree structure is shown in FIG. 5A as an example implementation for illustration purposes, it will be appreciated that other structure or approaches can be used. A location can be a leaf node in a partition tree (or hierarchy) of location keys.

Figure 5B:
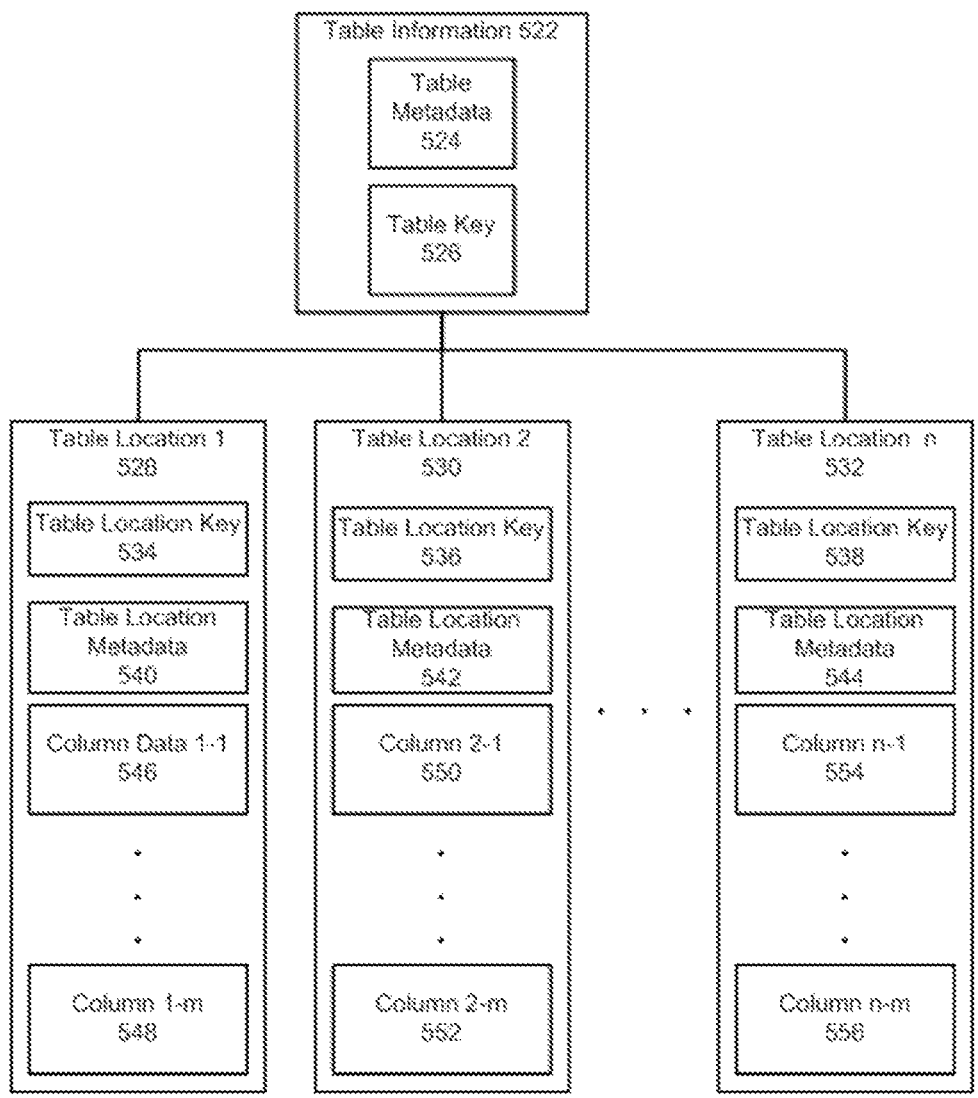

FIG. 5B is a diagram of an example table 520 pointed to by table location data (e.g., 516 or 518). The table 520 includes table-level information such as table metadata 524 and table key information 526. The table metadata 524 can include column name(s), data type(s), special properties (e.g., grouping, partitioning, etc.) and storage information). The table key 526 can include the table namespace, table name, and table type (e.g., system, user, etc.).

The table 520 can include one or more locations (528-532). Each table location (528-532) can include table location key information (e.g., 534-538, respectively) and table location metadata (540-544, respectively). Each table location (528-532) can also include column data (546-548, 550-552, and 554-556, respectively).

The table location key (e.g., 534-538 can include storage information (path, address, etc.), and partitioning column value(s) (e.g., date). The table location metadata (e.g., 540-544) can include table location size, modification time, etc.).

Column data (e.g., 546-556) can be represented by one or more files with per position (e.g., row number in this table location) access at the outermost table location level.

There is a processing cost associated with applying access controls to data sources. It would be fairly simple and low cost to either deny or grant a user access to a large data source without regard to the content of the large data source. The cost of granting or denying user access increases when access controls are applied separately to subsets of data. The cost further increases when a user has many roles within an organization and the system needs to decide which role should govern when granting access. Some of the cost can be lessened by building security into the data storage structure itself. More cost savings can be achieved by interleaving additional security measures into a secure data storage structure at levels that are only executed when a user has successfully navigated the built-in security measures. For example, a tree-based table storage structure can be used to implement filtering at different levels of the tree and permit interleaving of additional security measures at optimum levels of the tree.

Figure 5C:
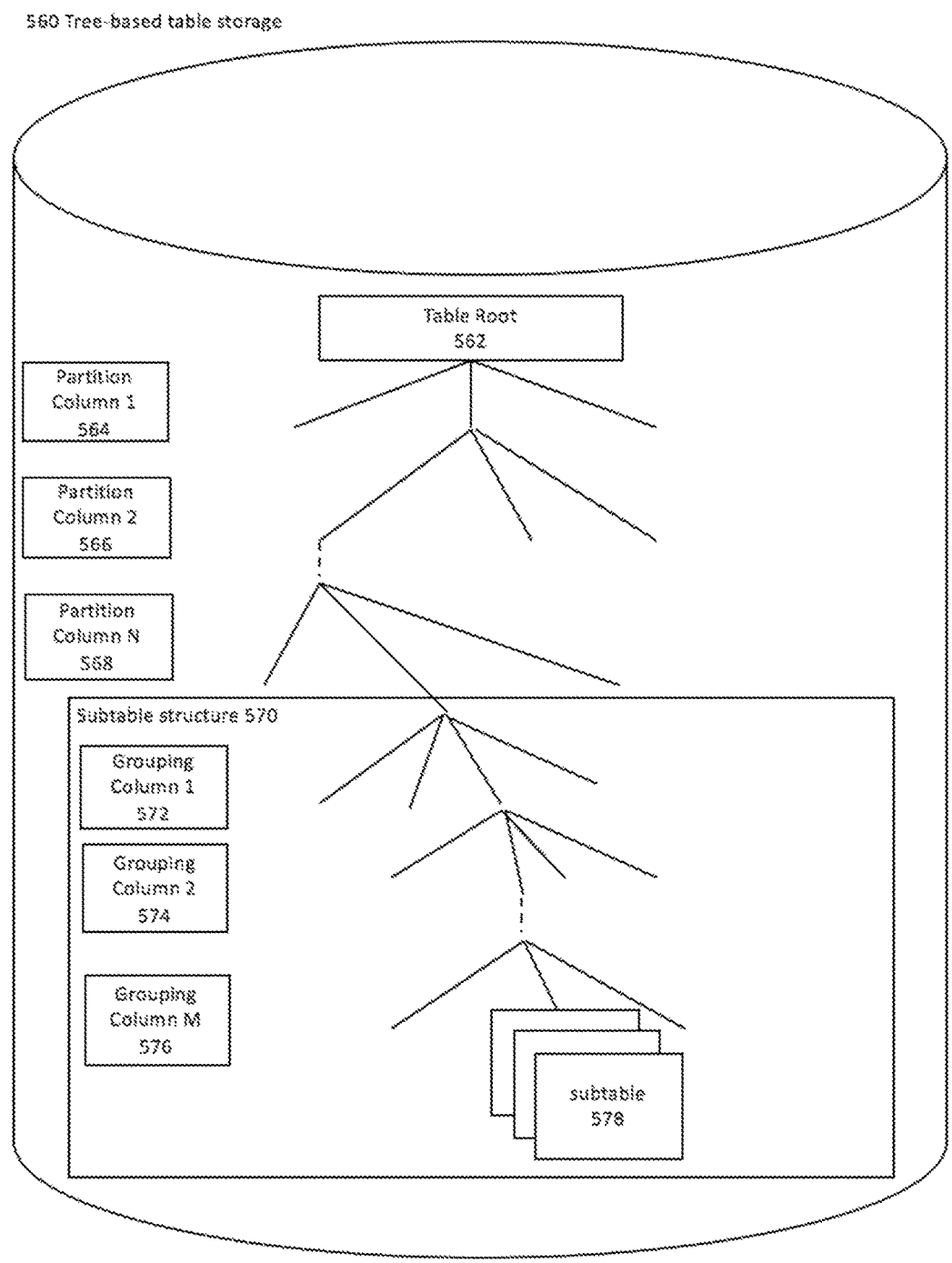
FIG. 5C is a diagram of an example tree-based table storage in accordance with some implementations.

FIG. 5C is a diagram of an example tree-based table storage 560 in accordance with at least one embodiment. Tables, especially large tables, can benefit from a hierarchical tree-based structure as shown in 560. The tree root 562 can be a table handle. Underneath the table root 562 can be a series of partition columns (564, 566, 568). The partitioning can be implemented in a filesystem, object store or the like. The partition columns (564, 566, 568) can be visible to a user or hidden from a user. For example, a column could be partitioned by date and each partition could contain data for a single date, such as 2016-03-18. In this example, the date can be a table column visible to a user. The partition columns can also be used to divide the workload for maintaining a column over more than one fileserver.

The leaf nodes of a partition column can be subtables. An example subtable structure is shown at 570. In a subtable structure 570, a subtable 578 can be stored for all rows and columns of a table.

For example, a table can have a logical table schema of columns for Date, Ticker Symbol, Timestamp, Bid Price and Ask Price. In this example, two partition columns can be created under the table root, one partition for Date and one partition for FileServer. The Date partition column (for example, 564) can contain directory paths to data for a single date, such as 2016-03-18. Because the data is all of the same date, 2016-03-18, the subtable 578 does not need to contain a Date value. In this example, the subtable 578 for the same date, 2016-03-18, can be spread across multiple file servers. A second partition column (for example, 566) is set under the Date partition column in the tree to provide a path, such as <table>/<date>/<fileserver>, to locate all the Date data for 2016-03-18. As noted earlier in this example, the Date partition column can be visible to a user, but a fileserver partition column may not be visible.

The data partition column is visible to the user to help the user formulate queries that can take advantage of the tree structure. For example, query performance can be enhanced by applying filters, such as where clauses, in an order based on the location of the data in a tree. Generally, applying the filter to a partition column closer to the table root 562 can minimize the amount of data processed to arrive at a final result. For example, in the Date, Ticker Symbol, Timestamp, Bid Price, Ask Price example, the most efficient filtering order is Date followed by Ticker Symbol. In this example, table.where ("Date=d", "Sym='AAPL'", "Bid>1000") can be much faster than table.where ("BID>1000", "Sym='AAPL'", "Date=d"). In table.where ("Date=d", "Sym='AAPL'", "Bid>1000"), only the subtable 578 under the date "d" partition column needs to be retrieved for processing because the subtable 578 in this example is already partitioned by date, the system does not need to provide any additional filtering work for date. In contrast table.where ("BID>1000", "Sym='AAPL'", "Date=d") can require every bid for every stock ticker for every date to be retrieved and processed because the "BID>1000" is processed first, and a partition column for "BID>1000" may not exist. As shown by this example, partition columns can be used to provide a tree structure that can permit the system to efficiently re-filter per each query the filters on the contents of the partition columns.

It will be appreciated that partition columns are not limited to Date or Fileserver. Any common attribute that would provide performance gains if pre-filtered can be a good candidate for partition columns.

It will also be appreciated that query performance gains can be achieved by creating grouping columns (572, 574, 576) underneath the Date data. For example, a grouping column could be created for each distinct ticker symbol.

The tree-based table storage 560 can also be used to insert access control filters to protect against unauthorized access to subtable 578. As with other filters, access control filters can affect the query efficiency depending on where in the tree, the access control filters are inserted. For example, if a user is not permitted access to ticker symbol for "AAPL" data, the access control filter can be written as "TickerSymbol !='AAPL'". In this example, if this access control filter is inserted before the Date filter, the performance can suffer because the query can first look through all data for AAPL across all available dates (could be years of data) instead of first filtering by Date, which is already a partition column.

User-specified and internal access control filters can be applied at the partition column and the grouping column levels. For example, a user-specified filter of Date='2016-03-18' can be applied to the Date partition column for where the Date='2016-03-18'. In applying the user-specified filters, it can be assumed that data in upper partition columns, such as Date, are generic enough that security is not an issue if the Date partition column is accessed prior to applying the internal access filter of "TickerSymbol !='AAPL'", because the user is already likely aware that data was collected for each date.

After applying the partition column filters, a two-pass access control approach can be taken with grouping columns because the grouping columns can contain sensitive data values, in contrast to the higher tree-level partition columns. User-specified filters can be divided into two classes: (1) filters which can execute system-controlled code, and (2) filters which can run user-controlled code. Filters which can run only system-controlled code can safely be executed against partition columns without leaking data to the user. Filters which can run user-controlled code may not be executed against the partitioning columns, as arbitrary user code can record values instead of simply filtering values. An example of a system-controlled filter can be a simple match (e.g., TickerSymbol='SPY'). An example of a user-controlled filter can be a filter that specifies a conditional formula (e.g., TickerSymbol.contains("1")). In a first pass, the system can execute user-specified filters on the partitioning columns that execute only system-specified code. Next, the internal access-control filters can be applied, thereby removing all rows that the user does not have authorization to access. For example, after the internal access-control filters are applied, no rows are in the result set which the user does not have authorization to access. The system can then apply user-specified filters that can contain user-controlled code to partitioning columns. Finally, other user-specified filters can be applied to the remaining columns.

FIG. 6 is a diagram of an example user-group table 600 in accordance with at least one embodiment. The user-group table 600 can include a user column 602 and a security group column 604. The user column 602 can contain rows that can contain user names. The security group column 604 can contain rows that can contain security group names.

It will be appreciated that additional columns may be added to the user-group table 600 (e.g., unique id key, time stamp of creation, time stamp of last update, etc.).

It will be appreciated that the user-group information shown in table 600 is not limited to table form and can also be maintained in other forms and formats. For example, the user information and security group information can be stored in files, xml, objects, etc.

FIG. 7 is a diagram of an example data source specific access control table 700 in accordance with at least one embodiment. The data source specific access control table 700 can include a security group column 702, a table namespace column 704, a table name column 706, and a filter generator column 708. The security group column 702 can contain rows that can contain security group names. The data source specific access control table 700 can be joined with the user-group table 600 keying on the security group columns 604 and 702. The table namespace column 704 can contain the identifier for a particular table namespace. The table name column 706 can contain the identifier for a particular table. The filter generator column 708 can contain code snippets or objects that can be used to generate filters for access control to tables during a data filtering operation. The code snippets or object can be implemented in a specified interface and can contain user parameters provided when the code snippets or object are constructed.

It will be appreciated that additional columns may be added to the data source specific access control table 700 (e.g., unique id key, time stamp of creation, time stamp of last update, etc.).

It will also be appreciated that other methods in addition to table namespace and table name can be used to locate tables. For example, a path can be provided to a table, such as /domain_name/fileserver_name/table_name/.

It will be appreciated that the data source specific access control information shown in table 700 is not limited to table form and can also be maintained in other forms and formats. For example, the security group information, table namespace information, table name information and filter generator information can be stored in files, xml, objects, etc.

It will also be appreciated that the data source specific access control table could apply to other forms of data stores other than tables such as files, xml, objects, etc.

Figure 8:
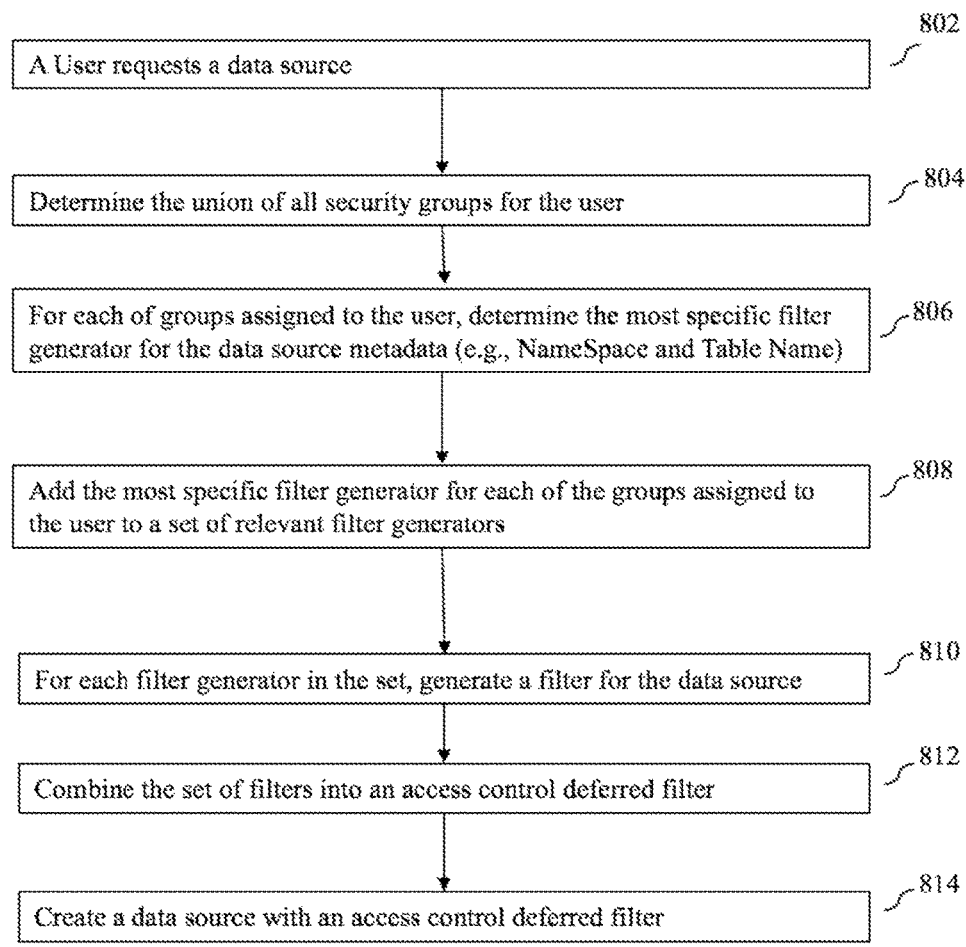
FIG. 8 is a flowchart of an example of creating an access control deferred filter for a table process in accordance with some implementations.

FIG. 8 is a flowchart of an example method 800 for creating a non-filtered data source with an access control deferred filter in accordance with at least one embodiment. Processing begins at 802 when a data source is requested by a user. A user can request a data source by identifying a data source type, a data source name and a data source location. For example, the data source type can include real-time, intraday, historical, or the like. Processing continues to 804.

At 804, the union of all security groups for the user is determined. For example, in user-group table 600 there are two users identified in the user column 602. A union of all security groups for user "Carlos" in column 602 would include "Carlos", "Allusers", and "Developers" from the security group column 604. Processing continues to 806.

At 806, the union of all security groups from the user-group table 600 is applied to the data source identified in the data source specific access control table 700 to determine the most specific filter generator for the data source's metadata. For example, in the data source specific access control table 700 the security groups 702 that apply to Carlos are the "Allusers" and "Developers" security groups. If only one matching row exists (not shown) for "Allusers" in the data source access control table, then the filter generator in the filter generator column would be by default of only having one row, the most specific generator. In the FIG. 7 example, "Allusers" contains four rows. The first "Allusers" row contains data source metadata (table namespace 704, table name 706) of "*" and "*" with a filter generator column 708 of "*". The "*" is used here as a wildcard meaning that all possible values are valid. If no other rows exist in 700, "Allusers" can have full access to all table namespace and table name combinations without any further security filtering by the filter generator column, which also has in this example, the wildcard, "*". But this example includes three more rows for "Allusers." The second "Allusers" row contains data source metadata (table namespace 704, table name 706) of "ACCOUNT_DB" and "*" with a filter generator column 708 of "NO_ACCESS." The third "Allusers" row contains data source metadata (table namespace 704, table name 706) of "MAIN_DB" and "*" with a filter generator column 708 of "WhereClause (parameters 1)". The fourth "Allusers" row contains data source metadata (table namespace 704, table name 706) of "MAIN_DB" and "Shipments" with a filter generator column 708 of "WhereClause (parameters 2)". Four examples using the three example "Allusers" rows are now provided to demonstrate how the most specific filter generator is chosen.

In a first example, a user can query a database using NameSpace$_{-1}$ and TableName$_{-1}$. In this example, the only match in 700 for the table namespace 704 and tablename 706 columns are the wildcards. Accordingly, for this example, the most specific filter generator is the wildcard, which effectively does not further limit the security applied.

In a second example, a user's access to all tables of the account_db can be prohibited by the "NO_ACCESS" designation.

In a third example, a user can query a database using MAIN_DB and TableName$_{-1}$. In this example, the closest or most precise match in 700 for the table namespace 704 and tablename 706 columns are "MAIN_DB" and the wildcard. Accordingly, for this example, the most specific filter generator is WhereClause (parameters 1) as shown in filter generator column 708 for "MAIN_DB" and wildcard row.

In a fourth example, a user can query a database using MAIN_DB and Shipments. In this example, the most precise match in 700 for the table namespace 704 and tablename 706 columns are "MAIN_DB" and "Shipments," respectively. Accordingly, for this example, the most specific filter generator is WhereClause (parameters 2) as shown in filter generator column 708 for "MAIN_DB" and "Shipments." Processing continues to 808.

At 808, the most specific filter generator for each of the user's security groups determined in step 806 is added to a set of relevant filter generators for that particular user and the data source determined by the table namespace 704 and tablename 706. Processing continues to 810.

At 810, for each filter generator that was added to the set of relevant filter generators in step 808, a filter can be generated for the data source. For example, continuing with the "Allusers" examples from step 808, if the data source can be determined by "MAIN_DB" and "Shipments" the filter generator added for "Allusers" can be "WhereClause (parameters 2), and for "Developers" can be "WhereClause (parameters 3)" and "WhereClause (parameters 4)". The wildcard would be added for "SuperUser." Processing continues to 812.

At 812, the set of generated filters can be combined into an access control deferred filter. Continuing the example from 810, the most specific filter generated for "Allusers", "MAIN_DB", "Shipments", "WhereClause (parameters 2) can be combined along with any filters generated for "Developers", and "SuperUser".

It will be appreciated that the access control filters can be combined in a variety of ways, such as an access control disjunctive filter, an access control conjunctive filter, or the like. For example, rather than allowing access to a disjunction of rows providing a union; the filters can be combined conjunctively providing an intersection. Processing continues to 814.

At 814, the data source requested in 802 is created as a non-filtered data source with access control supplemented by the deferred access control filter. The access control deferred filter can be stored in the table metadata 504 in the table information 502. The access control deferred filter can be stored in an in-memory object representation of the table that can contain an index and references to relevant data. This storage location for the access control deferred filter can provide quick access to the filter and the access control deferred filter can be applied when data in the table is accessed whether it be accessed through filtering, viewing, or another table operation.

It will be appreciated that access control filters can be created for any data source that can be associated with metadata. For example, access control filters can be created for partitioned, column-based table objects, non-partitioned relational database tables, flat files, xml, data objects, etc.

Figure 9:
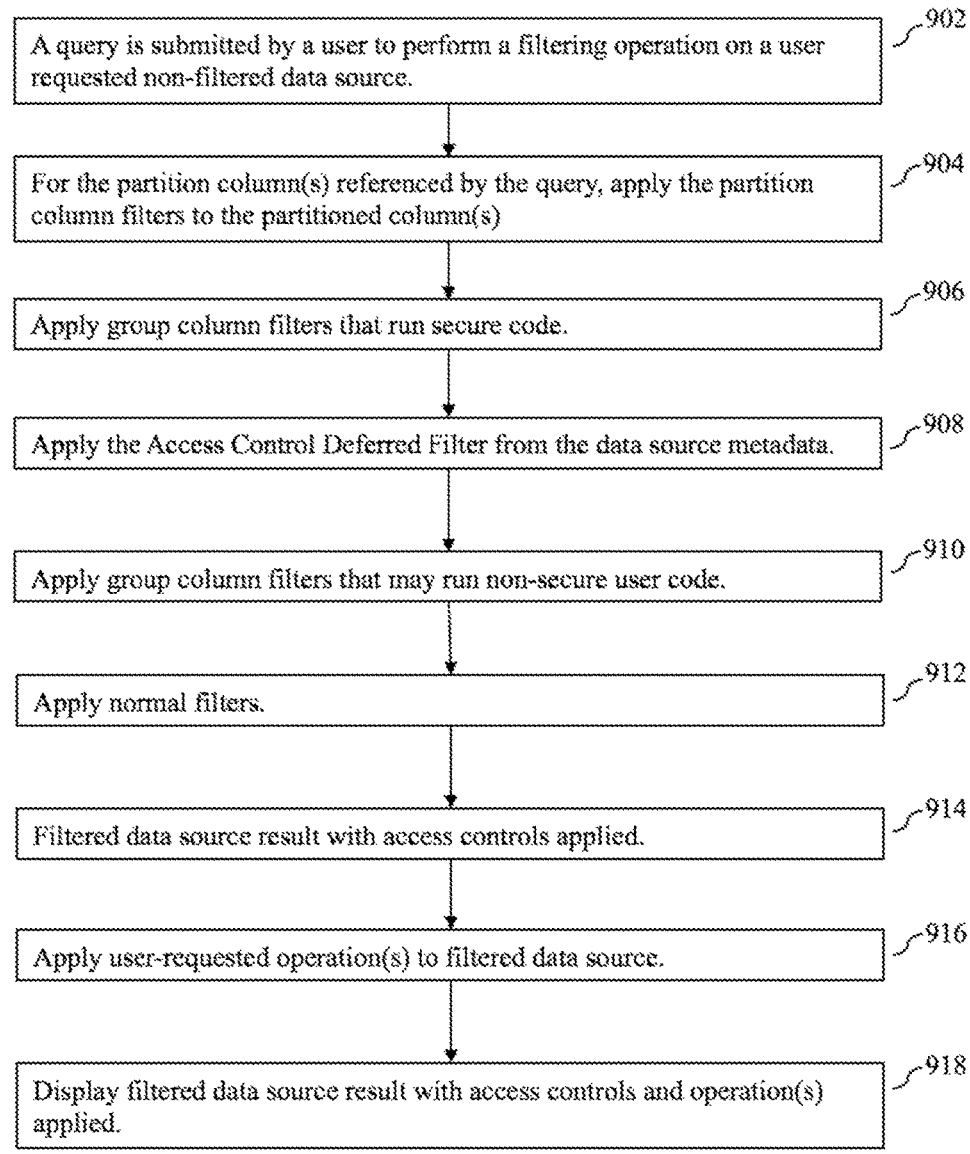
FIG. 9 is a flowchart of an example of applying access-based controls in coordination with user-based controls to a non-filtered table in accordance with some implementations.

FIG. 9 is a flowchart of an example method for applying access controls and user-specified filters 900 in accordance with at least one embodiment. The access controls can be applied before the user can see the table (e.g. display it in a GUI or otherwise access the data). In general, when filtering a data source in response to a query, filtering helps to ensure that a minimal amount of data is loaded into memory for operational processing. For example, a user can access a large table that contains billions of rows of data. The table can contain thousands of stock ticker symbols with time-stamped quoted prices. If a user's query can retrieve the full table, the results can be unwieldy. Through filtering, a user can retrieve a subset of rows from the large table with a focus on the user's interest. For example, the user may only be interested in rows for the ticker stock symbol "AAPL" with quoted prices over $100 on 2016-03-18. A user can apply filters such as "where ticker stock symbol="AAPL" and "quoted prices are greater than $100" and "the date is 2016-03-18" to retrieve only the subset of interest.

It will be appreciated that many of the coding examples given are presented in pseudo code. The filtering can be implemented in any coding language that is supported by a system for querying data sources.

Processing begins at 902 when a query that contains an operation on a non-filtered data source with a deferred access control list can be received from a user. The metadata of the non-filtered data source can contain a deferred access control filter similar to the access control filter generated in process 800. Processing continues to 904.

At 904, partition column filtering is applied. For example, the data may be stored as represented in FIG. 5C with partition column 1 564 containing data partitioned by date and column partition 2 566 containing data portioned by fileserver location. When the system receives the query it can proceed down the tree 560 from the table root 562 to the first partition 564. If the user has filtered on a date or a range of dates, the system can identify the partition columns with the associated date or date range. The system can proceed further down the tree to the partition columns for the fileserver locations of the data. If more partitions exist, the system can proceed to filter through the additional partitions.

If only two partitions are present, the system will proceed down the tree into the subtable groupings. Processing continues to 906.

At 906, the system proceeds down the tree and applies any secure grouping column filters that exist. For an example, a user can submit a query for a table filtered by TickerSymbol='AAPL'. If the data is grouped in the tree hierarchy by ticker symbols, a user-specified filter of TickerSymbol='AAPL' can be applied to the TickerSymbol grouping column for where the TickerSymbol='AAPL'. As the system applies the TickerSymbol='AAPL' without the need to execute user-controlled code, no sensitive data can be leaked to the user via the application of this user-specified filter. Processing continues to 908.

At 908, the access control filter is applied before the user can execute user written unsecure code. For example, the access control filter may contain a filter generated for "Allusers" such as: "Allusers", "MAIN_DB", "Shipments", "WhereClause (parameters 2)" combined along with filters generated for "Developers", and "SuperUser". After the access control filter is applied, the remaining user-specified filters are applied.

It will be appreciated that with the processing of the query through the table tree structure partition columns, grouping columns and the application of the access control filter, no user written code has been executed against the queried table. The access filters that have been applied are built into the data tree structure and the meta data of the table. Processing continues to 910.

It will be appreciated that filters are not limited to equality filters executing only system-controlled code. The system can parse a variety of user-specified filters and implement them with system-controlled code. For example, greater than, less then, not equals, range checks, inclusion, arbitrarily complex code, or any other operation that the system can identify or appropriately sandbox may be executed before the access control filter is applied.

At 910, a second pass through the group filters is executed, but this time with the application of the user-specified filters containing code that may not be controlled by the system. For example, if the user query filtered by a formula on the ticker symbol (e.g., ticker symbol.contains ("AAPL"), the system would follow the tree structure to the data under the ticker symbol grouping column. Processing continues to 912.

At 912, normal filters are applied in response to the user's query. Normal filters can be filters that do not match any of the tree structures such as column partitions and grouping partitions. For example, Date and Fileserver location can be partition column examples and ticker symbol can be a grouping columns example. If the query contains a third filter component that is not a partition column or grouping column then that third filter component, a normal filter, can be executed against the subtable 578. For example, the Asking Price (Ask>16) may not be captured in a partition column or a grouping column. The query would follow the tree structure down through the Data and Fileserver location partition columns and then through the ticker symbol grouping column to arrive at the subtable 578. At this point the subtable is filtered by Ask>16.

It will be appreciated that the data may be spread across more than one subtable. For example, if a query attempts to retrieve data across many days with a value greater than "x", the query can require access to many date partitions and many subtables under those partitions. Processing continues to 914.

At 914, the filtered data source result with access controls applied is now available for an operation to be applied. For example, the filtered data source results may be all the rows for "AAPL" collected on 2016-03-18 with a Bid>14 and an Ask>16. The query can also contain an operation to be applied to this resultant data set, such as an a "select", "update", "join", "view", or the like. Processing continues to 916.

At 916, the operation is applied to the filtered data source. Processing continues to 918.

At 918, the resulting filtered data source with operation applied is displayed.

It will be appreciated that step 908, the application of the access control deferred filter can be applied at other levels of the table tree. For example, the access control filters can be applied at all levels of the tree.

It will be appreciated that method 900 for filtering a non-filtered data source with an access control filter as created in 800 is not limited to the filtering of any one particular data source type. Method 900 can be applied to any structured data source such as partitioned, column-based table objects, non-partition relational database tables, flat files, xml, data objects, etc.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC), a field programmable gate array (FPGA), graphics processing unit (GPU), or the like. The instructions can be compiled from source code instructions provided in accordance with a programming language such as Java, C, C++, C#.net, assembly or the like. The instructions can also comprise code and data objects provided in accordance with, for example, the Visual Basic™ language, a specialized database query language such as PL/SQL, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, or the like.

It is, therefore, apparent that there is provided, in accordance with the various embodiments disclosed herein, methods, systems and computer readable media for a permissions system including relationships of partitioning, grouping, and the application of access control deferred filters.

Application Ser. No. 15/154,974, entitled "DATA PARTITIONING AND ORDERING" and filed in the United States Patent and Trademark Office on May 14, 2016, is hereby incorporated by reference herein in its entirety as if fully set forth herein.

Application Ser. No. 15/154,975, entitled "COMPUTER DATA SYSTEM DATA SOURCE REFRESHING USING AN UPDATE PROPAGATION GRAPH" and filed in the United States Patent and Trademark Office on May 14, 2016, is hereby incorporated by reference herein in its entirety as if fully set forth herein.

Application Ser. No. 15/154,979, entitled "COMPUTER DATA SYSTEM POSITION-INDEX MAPPING" and filed in the United States Patent and Trademark Office on May 14, 2016, is hereby incorporated by reference herein in its entirety as if fully set forth herein.

Application Ser. No. 15/154,980, entitled "SYSTEM PERFORMANCE LOGGING OF COMPLEX REMOTE QUERY PROCESSOR QUERY OPERATIONS" and filed in the United States Patent and Trademark Office on May 14, 2016, is hereby incorporated by reference herein in its entirety as if fully set forth herein.

Application Ser. No. 15/154,983, entitled "DISTRIBUTED AND OPTIMIZED GARBAGE COLLECTION OF REMOTE AND EXPORTED TABLE HANDLE LINKS TO UPDATE PROPAGATION GRAPH NODES" and filed in the United States Patent and Trademark Office on May 14, 2016, is hereby incorporated by reference herein in its entirety as if fully set forth herein.

Application Ser. No. 15/154,984, entitled "COMPUTER DATA SYSTEM CURRENT ROW POSITION QUERY LANGUAGE CONSTRUCT AND ARRAY PROCESSING QUERY LANGUAGE CONSTRUCTS" and filed in the United States Patent and Trademark Office on May 14, 2016, is hereby incorporated by reference herein in its entirety as if fully set forth herein.

Application Ser. No. 15/154,985, entitled "PARSING AND COMPILING DATA SYSTEM QUERIES" and filed in the United States Patent and Trademark Office on May 14, 2016, is hereby incorporated by reference herein in its entirety as if fully set forth herein.

Application Ser. No. 15/154,987, entitled "DYNAMIC FILTER PROCESSING" and filed in the United States Patent and Trademark Office on May 14, 2016, is hereby incorporated by reference herein in its entirety as if fully set forth herein.

Application Ser. No. 15/154,988, entitled "DYNAMIC JOIN PROCESSING USING REAL-TIME MERGED NOTIFICATION LISTENER" and filed in the United States Patent and Trademark Office on May 14, 2016, is hereby incorporated by reference herein in its entirety as if fully set forth herein.

Application Ser. No. 15/154,990, entitled "DYNAMIC TABLE INDEX MAPPING" and filed in the United States Patent and Trademark Office on May 14, 2016, is hereby incorporated by reference herein in its entirety as if fully set forth herein.

Application Ser. No. 15/154,991, entitled "QUERY TASK PROCESSING BASED ON MEMORY ALLOCATION AND PERFORMANCE CRITERIA" and filed in the United States Patent and Trademark Office on May 14, 2016, is hereby incorporated by reference herein in its entirety as if fully set forth herein.

Application Ser. No. 15/154,993, entitled "A MEMORY-EFFICIENT COMPUTER SYSTEM FOR DYNAMIC UPDATING OF JOIN PROCESSING" and filed in the United States Patent and Trademark Office on May 14, 2016, is hereby incorporated by reference herein in its entirety as if fully set forth herein.

Application Ser. No. 15/154,995, entitled "QUERY DISPATCH AND EXECUTION ARCHITECTURE" and filed in the United States Patent and Trademark Office on May 14, 2016, is hereby incorporated by reference herein in its entirety as if fully set forth herein.

Application Ser. No. 15/154,996, entitled "COMPUTER DATA DISTRIBUTION ARCHITECTURE" 10087) and filed in the United States Patent and Trademark Office on May 14, 2016, is hereby incorporated by reference herein in its entirety as if fully set forth herein.

Application Ser. No. 15/154,997, entitled "DYNAMIC UPDATING OF QUERY RESULT DISPLAYS" and filed in the United States Patent and Trademark Office on May 14, 2016, is hereby incorporated by reference herein in its entirety as if fully set forth herein.

Application Ser. No. 15/154,998, entitled "DYNAMIC CODE LOADING" and filed in the United States Patent and Trademark Office on May 14, 2016, is hereby incorporated by reference herein in its entirety as if fully set forth herein.

Application Ser. No. 15/154,999, entitled "IMPORTATION, PRESENTATION, AND PERSISTENT STORAGE OF DATA" and filed in the United States Patent and Trademark Office on May 14, 2016, is hereby incorporated by reference herein in its entirety as if fully set forth herein.

Application Ser. No. 15/155,001, entitled "COMPUTER DATA DISTRIBUTION ARCHITECTURE" and filed in the United States Patent and Trademark Office on May 14, 2016, is hereby incorporated by reference herein in its entirety as if fully set forth herein.

Application Ser. No. 15/155,005, entitled "PERSISTENT QUERY DISPATCH AND EXECUTION ARCHITECTURE" and filed in the United States Patent and Trademark Office on May 14, 2016, is hereby incorporated by reference herein in its entirety as if fully set forth herein.

Application Ser. No. 15/155,006, entitled "SINGLE INPUT GRAPHICAL USER INTERFACE CONTROL ELEMENT AND METHOD" and filed in the United States Patent and Trademark Office on May 14, 2016, is hereby incorporated by reference herein in its entirety as if fully set forth herein.

Application Ser. No. 15/155,007, entitled "GRAPHICAL USER INTERFACE DISPLAY EFFECTS FOR A COMPUTER DISPLAY SCREEN" and filed in the United States Patent and Trademark Office on May 14, 2016, is hereby incorporated by reference herein in its entirety as if fully set forth herein.

Application Ser. No. 15/155,009, entitled "COMPUTER ASSISTED COMPLETION OF HYPERLINK COMMAND SEGMENTS" and filed in the United States Patent and Trademark Office on May 14, 2016, is hereby incorporated by reference herein in its entirety as if fully set forth herein.

Application Ser. No. 15/155,010, entitled "HISTORICAL DATA REPLAY UTILIZING A COMPUTER SYSTEM" and filed in the United States Patent and Trademark Office on May 14, 2016, is hereby incorporated by reference herein in its entirety as if fully set forth herein.

Application Ser. No. 15/155,011, entitled "DATA STORE ACCESS PERMISSION SYSTEM WITH INTERLEAVED APPLICATION OF DEFERRED ACCESS CONTROL FILTERS" and filed in the United States Patent and Trademark Office on May 14, 2016, is hereby incorporated by reference herein in its entirety as if fully set forth herein.

Application Ser. No. 15/155,012, entitled "REMOTE DATA OBJECT PUBLISHING/SUBSCRIBING SYSTEM HAVING A MULTICAST KEY-VALUE PROTOCOL" and filed in the United States Patent and Trademark Office on May 14, 2016, is hereby incorporated by reference herein in its entirety as if fully set forth herein.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A system for automatically applying access control deferred filters to a first table object, the system comprising:
   one or more hardware processors;
   a computer readable data storage device coupled to the one or more hardware processors, the computer readable data storage device having stored thereon software instructions that, when executed by the one or more hardware processors, cause the one or more hardware processors to perform operations including:
   receiving a user request submitted from a computing device for data from the first table object;
   requesting, from an access control list source stored in a computer medium, access control groups for a user;
   requesting, from an access control filter source in the computer medium, a set of filter generators for each access control group;
   determining, for each set of filter generators for each access control group, a filter generator based on first table metadata for the first table object configured to identify a computer medium source of the first table object data;
   for each determined filter generator, executing the determined filter generator to create a generator filter for the first table object;
   combining each of the generated filters for the first table object into an access control filter;
   creating a second table object in memory that references the first table object;
   associating the access control filter with the second table;
   making the second table object available for user operations;
   receiving a second user request from a computing device to perform a filtering operation on the second table object;
   accessing metadata of the second table object;
   retrieving a tree-based table storage structure from the metadata;
   traversing the tree-based table storage structure starting at a table root of the tree-based table storage structure;
   when the second user request requests data from one or more partition columns of the tree-based table storage structure, applying one or more partition column filters based on a partition column structure of the tree;
   when the second user request contains a filtering operation for one or more grouping columns of the tree-based table storage structure, in a first pass, executing user-specified filters on the one or more partition columns that execute only system-specified code, and between the first and a second pass, applying internal access-control filters, thereby removing all rows for which the user does not have authorized access by:
   retrieving the access control filter from the metadata;
   extracting filters from the access control filter that apply to the access control groups for the user;
   choosing a filter from the extracted filters;
   applying the chosen filter to the second user request;
   applying on the second pass one or more second grouping column filters based on a first filter request contained in the second user request;
   applying one or more normal filters contained in the second user request to identify a filtered data source result; and
   returning a final set of data.

2. The system of claim 1, wherein the access control filter includes an access control disjunctive filter.

3. The system of claim 1, wherein the access control filter includes an access control conjunctive filter.

4. A system for automatically applying access control deferred filters to a first table object, the system comprising:
one or more hardware processors;
a computer readable data storage device coupled to the one or more hardware processors, the computer readable data storage device having stored thereon software instructions that, when executed by the one or more hardware processors, cause the one or more hardware processors to perform operations including:
receiving a user request submitted from a computing device for data from the first table object;
requesting, from an access control list source stored in a computer medium, access control groups for a user;
requesting, from an access control filter source in the computer medium, a set of filter generators for each access control group;
determining, for each set of filter generators for each access control group, a filter generator based on first table metadata for the first table object configured to identify a computer medium source of the first table object data;
for each determined filter generator, executing the determined filter generator to create a generator filter for the first table object;
combining each of the generated filters for the first table object into an access control filter;
creating a second table object in memory that references the first table object;
associating the access control filter with the second table;
making the second table object available for user operations;
receiving a second user request from a computing device to perform a data access operation on the second table object;
accessing metadata of the second table object;
retrieving a tree-based table storage structure from the metadata;
traversing the tree-based table storage structure starting at a table root of the tree-based table storage structure;
when the second user request requests data from one or more columns of the tree-based table storage structure, applying internal access-control filters, thereby removing all rows for which the user does not have authorized access by:
retrieving the access control filter from the metadata;
extracting filters from the access control filter that apply to the access control groups for the user;
choosing a filter from the extracted filters;
applying the chosen filter to the second user request;
applying the data access operation; and
returning a final set of data.

5. A method for applying access control deferred filters to a first table object in a computer medium, the method comprising:
receiving a user request submitted from a computing device for data from the first table object;
requesting, from an access control list source stored in a computer medium, access control groups for a user;
requesting, from an access control filter source in the computer medium, a set of filter generators for each access control group;
determining, for each set of filter generators for each access control group, a filter generator based on first table metadata for the first table object configured to identify a computer medium source of the first table object data;
for each determined filter generator, executing the determined filter generator to create a generator filter for the first table object;
combining each of the generated filters for the first table object into an access control filter;
creating a second table object in memory that references the first table object;
associating the access control filter with the second table;
making the second table object available for user operations;
receiving a second user request from a computing device to perform a filtering operation on the second table object;
accessing metadata of the second table object;
retrieving a tree-based table storage structure from the metadata;
traversing the tree-based table storage structure starting at a table root of the tree-based table storage structure;
when the second user request requests data from one or more partition columns of the tree-based table storage structure, applying one or more partition column filters based on a partition column structure of the tree;
when the second user request contains a filtering operation for one or more grouping columns of the tree-based table storage structure, in a first pass, executing user-specified filters on the one or more partition columns that execute only system-specified code, and on a second pass, applying internal access-control filters, thereby removing all rows for which the user does not have authorized access by:
retrieving the access control filter from the metadata;
extracting filters from the access control filter that apply to the access control groups for the user;
choosing a filter from the extracted filters;
applying the chosen filter to the second user request;
applying one or more second grouping column filters based on a first filter request contained in the second user request;
applying one or more normal filters contained in the second user request to identify a filtered data source result; and
returning a final set of data.

6. The method of claim 5, wherein the access control filter includes an access control disjunctive filter.

7. The method of claim 5, wherein the access control filter includes an access control conjunctive filter.

8. A method for applying access control deferred filters to a first table object in a computer medium, the method comprising:
receiving a user request submitted from a computing device for data from the first table object;
requesting, from an access control list source stored in a computer medium, access control groups for a user;
requesting, from an access control filter source in the computer medium, a set of filter generators for each access control group;
determining, for each set of filter generators for each access control group, a filter generator based on first table metadata for the first table object configured to identify a computer medium source of the first table object data;
for each determined filter generator, executing the determined filter generator to create a generator filter for the first table object;

combining each of the generated filters for the first table object into an access control filter;
creating a second table object in memory that references the first table object;
associating the access control filter with the second table;
making the second table object available for user operations;
receiving a second user request from a computing device to perform a data access operation on the second table object;
accessing metadata of the second table object;
retrieving a tree-based table storage structure from the metadata;
traversing the tree-based table storage structure starting at a table root of the tree-based table storage structure;
when the second user request requests data from one or more columns of the tree-based table storage structure, applying internal access-control filters, thereby removing all rows for which the user does not have authorized access by:
retrieving the access control filter from the metadata;
extracting filters from the access control filter that apply to the access control groups for the user;
choosing a filter from the extracted filters;
applying the chosen filter to the second user request;
applying the data access operation; and
returning a final set of data.

9. A nontransitory computer readable medium having stored thereon software instructions that, when executed by one or more processors, cause the one or more processors to perform operations including:
receiving a user request submitted from a computing device for data from the first table object;
requesting, from an access control list source stored in a computer medium, access control groups for a user;
requesting, from an access control filter source in the computer medium, a set of filter generators for each access control group;
determining, for each set of filter generators for each access control group, a filter generator based on first table metadata for the first table object configured to identify a computer medium source of the first table object data;
for each determined filter generator, executing the determined filter generator to create a generator filter for the first table object;
combining each of the generated filters for the first table object into an access control filter;
creating a second table object in memory that references the first table object;
associating the access control filter with the second table;
making the second table object available for user operations;
receiving a second user request from a computing device to perform a filtering operation on the second table object;
accessing metadata of the second table object;
retrieving a tree-based table storage structure from the metadata;
traversing the tree-based table storage structure starting at a table root of the tree-based table storage structure;
if the second user request requests data from one or more partition columns of the tree-based table storage structure, applying one or more partition column filters based on a partition column structure of the tree;
if the second user request contains a filtering operation for one or more grouping columns of the tree-based table storage structure, in a first pass, executing user-specified filters on the one or more partition columns that execute only system-specified code, and on a second pass, applying internal access-control filters, thereby removing all rows for which the user does not have authorized access by:
retrieving the access control filter from the metadata;
extracting filters from the access control filter that apply to the access control groups for the user;
choosing a filter from the extracted filters;
applying the chosen filter to the second user request; and
returning a final set of data.

10. The nontransitory computer readable medium of claim 9, wherein the access control filter includes an access control disjunctive filter.

11. The nontransitory computer readable medium of claim 9, wherein the access control filter includes an access control conjunctive filter.

12. A nontransitory computer readable medium having stored thereon software instructions that, when executed by one or more processors, cause the one or more processors to perform operations including:
receiving a user request submitted from a computing device for data from the first table object;
requesting, from an access control list source stored in a computer medium, access control groups for a user;
requesting, from an access control filter source in the computer medium, a set of filter generators for each access control group;
determining, for each set of filter generators for each access control group, a filter generator based on first table metadata for the first table object configured to identify a computer medium source of the first table object data;
for each determined filter generator, executing the determined filter generator to create a generator filter for the first table object;
combining each of the generated filters for the first table object into an access control filter;
creating a second table object in memory that references the first table object;
associating the access control filter with the second table;
making the second table object available for user operations;
receiving a second user request from a computing device to perform a data access operation on the second table object;
retrieving a tree-based table storage structure associated with the second table object;
traversing the tree-based table storage structure starting at a table root of the tree-based table storage structure;
when the second user request requests data from one or more columns of the tree-based table storage structure, applying internal access-control filters, thereby removing all rows for which the user does not have authorized access by:
extracting filters from the access control filter that apply to the access control groups for the user;
choosing a filter from the extracted filters;
applying the chosen filter to the second user request;
applying the data access operation; and
returning a final set of data.

* * * * *